US009029481B2

(12) United States Patent
Nemoto et al.

(10) Patent No.: US 9,029,481 B2
(45) Date of Patent: May 12, 2015

(54) METHOD FOR PRODUCING POLYMER, DEVICE FOR PRODUCING POLYMER, DEVICE FOR PRODUCING COMPLEX, AND POLYMER PRODUCT

(75) Inventors: Taichi Nemoto, Shizuoka (JP); Chiaki Tanaka, Shizuoka (JP); Yoshitaka Yamauchi, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/805,962

(22) PCT Filed: Jul. 27, 2012

(86) PCT No.: PCT/JP2012/069776
§ 371 (c)(1),
(2), (4) Date: Jan. 3, 2013

(87) PCT Pub. No.: WO2013/018873
PCT Pub. Date: Feb. 7, 2013

(65) Prior Publication Data
US 2014/0296448 A1 Oct. 2, 2014

(30) Foreign Application Priority Data

Jul. 29, 2011 (JP) ................................. 2011-166634
Feb. 14, 2012 (JP) ................................. 2012-029272
Mar. 16, 2012 (JP) ................................. 2012-059755

(51) Int. Cl.
| *C08G 63/91* | (2006.01) |
| *C08G 63/81* | (2006.01) |
| *C08G 63/78* | (2006.01) |
| *C08L 67/04* | (2006.01) |
| *B01J 8/20* | (2006.01) |
| *B01J 19/24* | (2006.01) |
| *B01J 4/00* | (2006.01) |
| *B01J 8/00* | (2006.01) |
| *C08G 65/32* | (2006.01) |

(52) U.S. Cl.
CPC ............. *C08G 63/81* (2013.01); *C08G 63/78* (2013.01); *C08G 63/785* (2013.01); *C08L 67/04* (2013.01); *C08L 2205/02* (2013.01); *B01J 8/20* (2013.01); *B01J 19/2415* (2013.01); *B01J 19/243* (2013.01); *B01J 4/008* (2013.01); *B01J 8/0035* (2013.01); *B01J 2208/00548* (2013.01); *B01J 2208/00752* (2013.01); *B01J 2219/00164* (2013.01)

(58) Field of Classification Search
USPC ..................... 525/55, 474; 528/354
See application file for complete search history.

(56) References Cited

U.S. PATENT DOCUMENTS

| 2004/0072985 | A1 | 4/2004 | Lee et al. |
| 2007/0299236 | A1 | 12/2007 | Kim et al. |
| 2011/0104608 | A1 | 5/2011 | Nakajima et al. |
| 2011/0218301 | A1* | 9/2011 | Nemoto et al. ................. 525/55 |
| 2011/0218313 | A1 | 9/2011 | Mase et al. |
| 2012/0129094 | A1 | 5/2012 | Yamauchi et al. |
| 2012/0322005 | A1 | 12/2012 | Tanaka et al. |

FOREIGN PATENT DOCUMENTS

| CA | 2 844 896 | 2/2013 |
| JP | 2008-259676 | 10/1996 |
| JP | 3377143 | 12/2002 |
| JP | 2004-277698 | 10/2004 |
| JP | 2006-276573 | 10/2006 |
| JP | 2008-002048 | 1/2008 |
| JP | 2008-063420 | 3/2008 |
| JP | 2008-214388 | 9/2008 |
| JP | 2009-001619 | 1/2009 |
| JP | 2011-053657 | 3/2011 |
| JP | 2011-208115 | 10/2011 |

OTHER PUBLICATIONS

Idriss Blakey, et al., "Controlled polymerisation of lactide using an organo-catalyst in supercritical carbon dioxide", Green Chemistry, 2011, Advance Article.
Hullathy Subban Ganapathy, et al., "Ring-opening polymerization of L-lactide in supercritical carbon dioxide using PDMS based stabilizers", European Polymer Journal, vol. 43, 2007, pp. 119-126, 2007.
International Search Report Issued Oct. 16, 2012 in PCT/JP2012/069776 filed Jul. 27, 2012.
Written Option Issued Oct. 1, 2012 in PCT/JP12/69776 filed Jul. 27, 2012.
David D. Hile, et al., "Ring-opening precipitation polymerization of poly(D,L-lactide-co-glycolide) in supercritical carbon dioxide", Macromol. Rapid Commun., No. 20, pp. 511-514, 1999.
David D Hile, et al., "Emulsion Copolymerization of D,L-Lactide and Glycolide in Supercritical Carbon Dioxide", Journal of Polymer Science Part A: Polymer Chemistry, vol. 39, pp. 562-570, 2001.
Chiaki Tanaka, "Metal-free low temperature continuous polymerization technique for polylactic acid", Convertech, 2012, 6, pp. 114-116 (with English translation).
Nobuyuki Mase, "Organocatalytic Ring-opening Polymerization in Supercritical Carbon Dioxide: Metal- and Organic Solvent-free Synthesis of Polylactide", Monthly Fine Chemical, vol. 40, No. 9, Sep. 2011, pp. 47-53, (with English translation).
Taichi Nemoto, et al., "Metal free low temperature continuous polymerization Technique for polylactic acid", Japan Plastics Nov. 2012, Published on Nov. 10, 2012, vol. 63, No. 11, pp. 23-26 (with English translation).

(Continued)

*Primary Examiner* — Terressa Boykin
(74) *Attorney, Agent, or Firm* — Oblon, McClelland, Maier & Neustadt, L.L.P.

(57) ABSTRACT

A method for producing a polymer, by continuously supplying and bringing at least a ring-opening polymerizable monomer and a compressive fluid into contact with each other, to thereby allow the ring-opening polymerizable monomer to carry out ring-opening polymerization to continuously generate a polymer.

17 Claims, 5 Drawing Sheets

(56) References Cited

OTHER PUBLICATIONS

Nobuyuki Mase, "11. Metal-Free, Organic Solvent-Free Synthesis of Polylactic Acid: Utilization of Organic Molecule Catalyst and Supercritical Carbon Dioxide", Development of plant derived polymer and composite material, Science & Technology, First Edition, Dec. 22, 2011, pp. 81-88, (with English translation).

"A new metal-free and low temperature polymerization of Poly lactic acid", Nano Tech 2012, conference Tokyo Japan, Feb. 15-17, 2012, (Ricoh), 7 pages.

Office Action issued Feb. 12, 2015, in Canadian Patent Application No. 2,843,239 filed Jul. 27, 2012.

* cited by examiner

METHOD FOR PRODUCING POLYMER, DEVICE FOR PRODUCING POLYMER, DEVICE FOR PRODUCING COMPLEX, AND POLYMER PRODUCT

TECHNICAL FIELD

The present invention relates to a method and device for producing a polymer through ring-opening polymerization of a ring-opening polymerizable monomer.

BACKGROUND ART

It is a conventionally known method that a polymer is produced through ring-opening polymerization of a ring-opening polymerizable monomer. For example, there is disclosed a method for producing polylactic acid by allowing a polymerization raw material containing lactide as a main component to react in a melted state to proceed to polymerization (see PTL 1). In accordance with the disclosed method, lactide is reacted to polymerize using tin as a catalyst, and setting a reaction temperature to 195° C.

When polylactic acid is produced by this production method, however, a polymer product contains more than 2% by weight of lactide residues (see PTL 1). This is because an equilibrium relationship between a ring-opening polymerizable monomer and a polymer is established in a reaction system of ring-opening polymerization of lactide, and a ring-opening polymerizable monomer tends to be generated by a depolymerization reaction when ring-opening polymerization of a ring-opening polymerizable monomer is performed at high temperature as the aforementioned reaction temperature. The lactide residues (ring-opening polymerizable monomer) may function as a catalyst for hydrolysis of a polymer product, or impair thermal resistance of the polymer product.

As for a method for carrying out ring-opening polymerization of a ring-opening polymerizable monomer at low temperature, there is disclosed a polymerization method using supercritical carbon dioxide as a solvent, and using 1,8-diazabicyclo[5.4.0]undec-7-ene (DBU) as a catalyst (see NPL 1). In the disclosed method, lactide is polymerized by, after charging an autoclave with lactide, DBU, and benzyl alcohol, adding carbon dioxide thereto, mixing the mixture at the temperature of 80° C. and the pressure of 70 atm., and further adding carbon dioxide, followed by increasing the pressure to 250 atm. In accordance with this method, a polymer having a number average molecular weight of appropriately 10,000 is obtained by reacting for 16 hours.

CITATION LIST

Patent Literature

PTL 1: Japanese Patent Application Laid-Open (JP-A) No. 08-259676

Non-Patent Literature

NPL 1: Idriss Blakey, Anguang Yu, Steven M. Howdle, Andrew K. Whittakera and Kristofer J. Thurechta, Green Chemistry, 2011, Advance Article

SUMMARY OF INVENTION

Technical Problem

In polymerization of ring-opening polymerizable monomer, such as lactide, using a compressive fluid, such as supercritical carbon dioxide, as a solvent, there is a problem that a reaction time thereof is long.

The present invention aims to solve the aforementioned various problems in the art, and to achieve the following object. An object of the present invention is to provide a method for producing polymer, which reduces a reaction time required for polymerization reaction, compared to that in a conventional production method for performing ring-opening polymerization of a ring-opening polymerizable monomer using a compressive fluid.

Solution to Problem

Means for solving the aforementioned problems is as follows:

A method for producing a polymer of the present invention contains: continuously supplying and bringing at least a ring-opening polymerizable monomer and a compressive fluid into contact with each other, to thereby allow the ring-opening polymerizable monomer to carry out ring-opening polymerization to continuously generate a polymer.

Advantageous Effects of Invention

As explained above, the method for producing a polymer of the present invention contains continuously bringing at least a ring-opening polymerizable monomer and a compressive fluid into contact with each other, to thereby allow the ring-opening polymerizable monomer to carry out ring-opening polymerization to continuously generate a polymer. As a result, the present invention can provide a method for producing a polymer, which reduces a reaction time required for polymerization reaction, compared to that in a conventional production method for performing ring-opening polymerization of a ring-opening polymerizable monomer using a compressive fluid.

Figure 1:
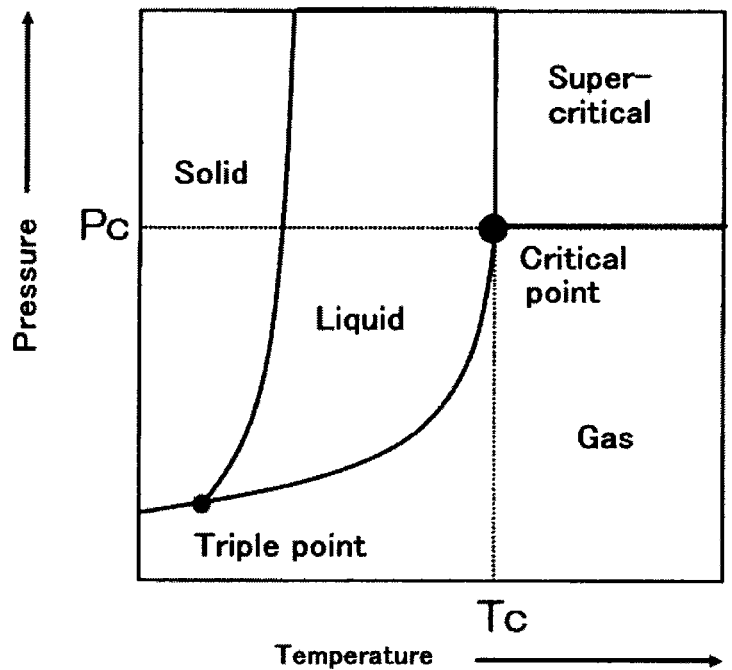
FIG. 1 is a general phase diagram depicting the state of a substance depending on pressure and temperature conditions.

DESCRIPTION OF EMBODIMENTS (Method for Producing Polymer)
[First Embodiment]
The first embodiment of the present invention will be specifically explained hereinafter.

The method for producing a polymer of the present embodiment contains at least a polymerization step, and may further contain other steps, if necessary.
<Polymerization Step>
The polymerization step is continuously supplying and bringing at least a ring-opening polymerizable monomer and a compressive fluid into contact with each other, to thereby allow the ring-opening polymerizable monomer to carry out ring-opening polymerization to continuously generate a polymer —Raw Materials—

First, substances, such as a ring-opening polymerizable monomer, used as raw materials in the aforementioned production method will be explained.

In the present embodiment, the raw materials are materials used as a base for producing a polymer, and are materials that become constitutional components of the polymer. The raw materials contain at least a ring-opening polymerizable monomer, and may further contain appropriately selected optional substances, such as an initiator, and additives.

—Ring-Opening Polymerizable Monomer—

The ring-opening polymerizable monomer for use in the present embodiment is appropriately selected depending on the intended purpose without any limitation, but it is preferably a ring-opening polymerizable monomer having a ring structure containing a carbonyl skeleton, such as an ester bond therein, although it depends on a combination of a ring-opening polymerizable monomer and a compressive fluid for use. The carbonyl skeleton is formed with oxygen, which has high electronegativity, and carbon bonded together to form a π-bond. Because of electrons of the π-bond, oxygen is negatively polarized, and carbon is positively polarized, and therefore reactivity is enhanced. In the case where the compressive fluid is carbon dioxide, it is assumed that affinity between carbon dioxide and a generated polymer is high, as the carbonyl skeleton is similar to the structure of carbon dioxide. As a result of these functions, a plasticizing effect of the generated polymer using the compressive fluid is enhanced. Examples of such ring-opening polymerizable monomer include cyclic ester and cyclic carbonate.

The cyclic ester is not particularly limited, but it is preferably a cyclic dimer obtained through dehydration condensation of an L-form and/or D form of a compound represented by General Formula 1.

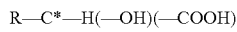  General Formula 1

In General Formula 1, R is a C1-C10 alkyl group, and C* represents an asymmetric carbon.

Specific examples of the compound represented by General Formula 1 include enantiomers of lactic acid, enantiomers of 2-hydroxybutanoic acid, enantiomers of 2-hydroxypentanoic acid, enantiomers of 2-hydroxyhexanoic acid, enantiomers of 2-hydroxyheptanoic acid, enantiomers of 2-hydroxyoctanoic acid, enantiomers of 2-hydroxynonanoic acid, enantiomers of 2-hydroxydecanoic acid, enantiomers of 2-hydroxyundecanoic acid, and enantiomers of 2-hydroxydodecanoic acid. Among them, enantiomers of lactic acid are preferable since they are highly reactive and readily available. These cyclic dimers may be used independently or in combination.

The usable cyclic ester other than the compound represented by General Formula 1 include, for example, aliphatic lactone, such as β-propiolactone, β-butyrolactone, γ-butyrolactone, γ-hexanolactone, γ-octanolactone, δ-valerolactone, δ-hexanolactone, δ-octanolactone, ε-caprolactone, δ-dodecanolactone, α-methyl-γ-butyrolactone, β-methyl-δ-valerolactone, glycolide and lactide. Among them, ε-caprolactone is preferable since it is highly reactive and readily available.

The cyclic carbonate is not particularly limited, and examples thereof include ethylene carbonate, and propylene carbonate. These ring-opening polymerizable monomers may be used independently, or in combination.

—Catalyst—

In the present embodiment, a catalyst is preferably used.

The catalyst is appropriately selected depending on the intended purpose without any limitation, and it may be a metal catalyst containing a metal atom, or an organic catalyst that does not contain a metal atom.

The metal catalyst is appropriately selected from conventional metal catalysts known in the art without any limitation, and examples thereof include: a tin compound, such as tin octylate, tin dibutylate, and tin bis(2-ethylhexanoate); an aluminum compound, such as aluminum acetylacetonate, and aluminum acetate; a titanium compound, such as tetraisopropyl titanate, and tetrabutyl titanate; a zirconium compound, such as zirconium isopropoxide; and an antimony compound, such as antimony trioxide.

As for the catalyst for use in the present embodiment, an organic catalyst free from a metal atom (an organic compound free from a metal atom) is suitably used for use of a polymer product requiring its safety and stability. Use of an organic catalyst free from a metal atom as a catalyst is preferable in the present embodiment, because, compared to a conventional method for ring-opening polymerization of a ring-opening polymerizable monomer using an organic catalyst free from a metal atom, a method for producing a polymer, which reduces reaction time, and gives excellent polymerization rate can be provided. In the present embodiment, the organic catalyst free from a metal atom may be any organic catalyst, provided that it contributes to a ring-opening reaction of the ring-opening polymerizable monomer to form an active intermediate together with the ring-opening polymerizable monomer, and it then can be removed and regenerated through a reaction with alcohol.

The organic catalyst free from a metal atom is appropriately selected depending on the intended purpose without any limitation, but it is preferably a basic compound acting as a nucleophilic agent, more preferably a basic nucleophilic nitrogen atom-containing compound, and even more preferably a basic nucleophilic nitrogen atom-containing cyclic compound. Note that, the nucleophilic agent (or nucleophilicity) is chemical species (and characteristics thereof) that react with an electrophile. Such compound is not particularly limited, and examples thereof include cyclic monoamine, cyclic diamine (a cyclic diamine compound having an amidine skeleton), a cyclic triamine compound having a guanidine skeleton, a heterocyclic aromatic organic compound containing a nitrogen atom and N-heterocyclic carbene. Note that, a cationic organic catalyst free from a metal atom can be used for the aforementioned ring-opening polymerization reaction, but the cationic organic catalyst pulls hydrogen atoms out of the polymer backbone (back-biting). As a result, a resulting polymer product tends to have a wide molecular weight distribution, and it is difficult to obtain a high molecular weight polymer.

The cyclic monoamine is appropriately selected depending on the intended purpose without any limitation, and examples thereof include quinuclidine. The cyclic diamine is appropriately selected depending on the intended purpose without any limitation, and examples thereof include 1,4-diazabicyclo[2.2.2]octane (DABCO) and 1,5-diazabicyclo(4,3,0)nonene-5. The cyclic diamine compound having an amidine skeleton includes 1,8-diazabicyclo[5.4.0]undec-7-ene (DBU) and diazabicyclononene. The cyclic triamine compound having a guanidine skeleton is appropriately selected depending on the intended purpose without any limitation, and examples thereof include 1,5,7-triazabicyclo[4.4.0]dec-5-ene (TBD) and diphenylguanidine (DPG).

Examples of the heterocyclic aromatic organic compound containing a nitrogen atom include N,N-dimethyl-4-aminopyridine (DMAP), 4-pyrrolidinopyridine (PPY), pyrrocolin, imidazol, pyrimidine and purine. Examples of the N-heterocyclic carbine include 1,3-di-tert-butylimidazol-2-ylidene (ITBU). Among them, DABCO, DBU, DPG, TBD, DMAP, PPY, and ITBU are preferable, as they have high nucleophilicity without being greatly affected by steric hindrance, or they have such boiling points that they can removed under the reduced pressure.

Among these organic catalysts free from a metal atom, for example, DBU is liquid at room temperature, and has a boiling point. In the case where such organic catalyst free from a metal atom is selected for use, the organic catalyst free from a metal atom can be removed substantially quantitatively from the obtained polymer by treating the polymer under the reduced pressure. Note that, the type of the organic solvent, or whether or not a removal treatment is performed, is determined depending on an intended use of a generated polymer product.

An amount of the organic catalyst free from a metal atom for use cannot be determined unconditionally as it varies depending on a combination of the compressive fluid and the ring-opening polymerizable monomer for use, but it is preferably 0.01 mol % to 15 mol %, more preferably 0.1 mol % to 1 mol %, and even more preferably 0.3 mol % to 0.5 mol %, relative to 100 mol % of the ring-opening polymerizable monomer. When the amount thereof is smaller than 0.01 mol %, the organic catalyst free from a metal atom is deactivated before completion of the polymerization reaction, and as a result a polymer having a target molecular weight cannot be obtained in some cases.

When the amount thereof is greater than 15 mol %, it may be difficult to control the polymerization reaction.

—Optional Substances—

In the production method of the present embodiment, other than the aforementioned ring-opening polymerizable monomer, a ring-opening polymerizable initiator (i.e., an initiator) or other additives may be used as optional substances of the raw materials.

—Initiator—

An initiator is suitably used for controlling a molecular weight of a polymer product obtainable in the present embodiment. The initiator can be selected from conventional initiators known in the art. In the case of an alcohol-based initiator, for example, mono-, di-, or polyhydric alcohol of aliphatic alcohol may be used. The initiator may be saturated or unsaturated. Specific examples of the initiator include: monoalcohol such as methanol, ethanol, propanol, butanol, pentanol, hexanol, heptanol, nonanol, decanol, lauryl alcohol, myristyl alcohol, cetyl alcohol, and stearyl alcohol; dialcohol such as ethylene glycol, 1,2-propanediol, 1,3-propanediol, 1,3-butanediol, 1,4-butanediol, hexanediol, nonanediol, tetramethylene glycol, and polyethylene glycol; polyhydric alcohol such as glycerol, sorbitol, xylitol, ribitol, erythritol, and triethanol amine; and others such as methyl lactate, and ethyl lactate.

Also, a polymer in which an alcohol residue is present at a terminal of polycaprolactonediol or polytetramethylene glycol may be used as the initiator. A use of such polymer enables synthesis of diblock copolymers and triblock copolymers.

An amount of the initiator for use is appropriately adjusted depending on a target molecular weight of a resulting product, but it is preferably 0.05 mol % to 5 mol % relative to 100 mol % of the ring-opening polymerizable monomer. In order to prevent polymerization from being initiated unevenly, the initiator is ideally sufficiently mixed with the ring-opening polymerizable monomer in advance that the ring-opening polymerizable monomer is brought into contact with a polymerization catalyst.

—Additives—

Additives may optionally be added for ring-opening polymerization. Examples of the additives include a surfactant, an antioxidant, a stabilizer, an anticlouding agent, an UV-ray absorber, a pigment, a colorant, inorganic particles, various fillers, a thermal stabilizer, a flame retardant, a crystal nucleus agent, an antistatic agent, a surface wet improving agent, a combustion adjuvant, a lubricant, a natural product, a mold-releasing agent, a lubricant, and other similar additives. If necessary, a polymerization terminator (e.g., benzoic acid, hydrochloric acid, phosphoric acid, metaphosphoric acid, acetic acid and lactic acid) may be used after completion of polymerization reaction. An amount of the additives may vary depending on the purpose for adding the additives, or types of the additives, but it is preferably 0 to 5 parts by mass relative to 100 parts by mass of the polymer composition.

The surfactant is preferably selected from those dissolved in the compressive fluid and having compatibility to both the compressive fluid and the ring-opening polymerizable monomer. A use of the surfactant can give effects that the polymerization reaction can be uniformly progressed, and the resultant polymer has a narrow molecular weight distribution and be easily produced as particles. In the case where such surfactant is used, the surfactant may be added to the compressive fluid, or may be added to the ring-opening polymerizable monomer. In the case where carbon dioxide is used as the compressive fluid, for example, a surfactant having groups having affinity with carbon dioxide and groups having affinity with the monomer in a molecule thereof can be used. Examples of such surfactant include a fluorosurfactant and a silicone surfactant.

As for the stabilizer, for example, epoxidized soybean oil, or carbodiimide is used. As for the antioxidant, for example, 2,6-di-t-butyl-4-methyl phenol, or butylhydroxyanisol is used. As for the anticlouding agent, for example, glycerin fatty acid ester, or monostearyl citrate is used. As for fillers, for example, an UV-ray absorber, a thermal stabilizer, a flame retardant, an internal mold release agent, or inorganic additives having an effect of a crystal nucleus agent (e.g., clay, talc, and silica) is used. As for the pigment, for example, titanium oxide, carbon black, or ultramarine blue is used.

—Compressive Fluid—

Figure 2:
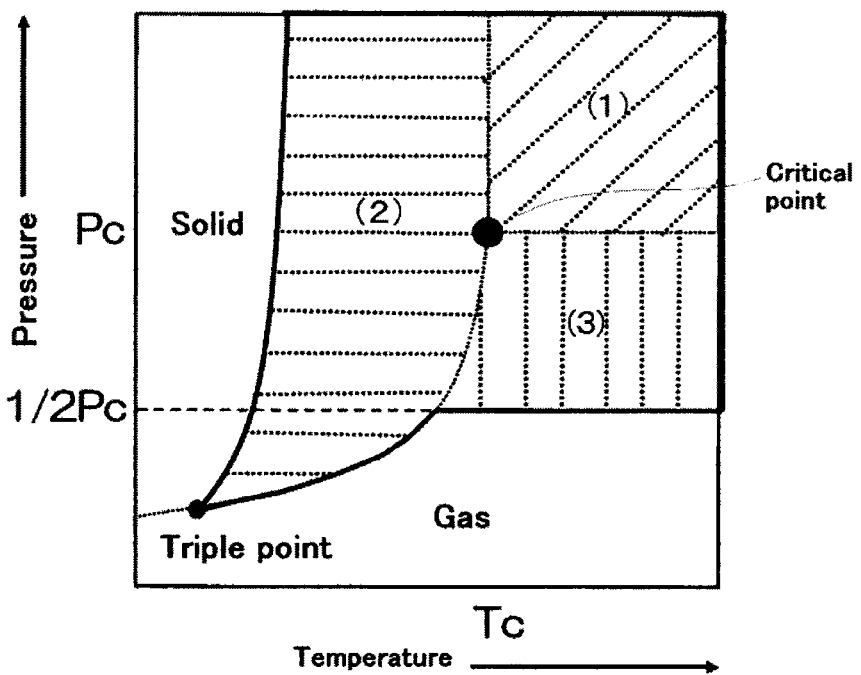
FIG. 2 is a phase diagram which defines a compressive fluid used in the present embodiment.

Next, the compressive fluid used in the method for producing a polymer of the present embodiment will be explained with reference to FIGS. 1 and 2. FIG. 1 is a general phase diagram depicting the state of a substance depending on pressure and temperature conditions. FIG. 2 is a phase diagram which defines a compressive fluid used in the present embodiment. The term "compressive fluid" in this specification refers to a substance present in any one of the regions (1), (2) and (3) of FIG. 2 in the phase diagram of FIG. 1.

In such regions, the substance is known to have extremely high density and show different behaviors from those shown at normal temperature and normal pressure. Note that, the substance present in the region (1) is a supercritical fluid. The supercritical fluid is a fluid that exists as a noncondensable high-density fluid at temperature and pressure exceeding the corresponding critical points, which are limiting points at which a gas and a liquid can coexist. Also, the supercritical fluid does not condense even when compressed. The substance present in the region (2) is a liquid, but in the present invention, it is a liquefied gas obtained by compressing a substance existing as a gas at normal temperature (25° C.) and normal pressure (1 atm). The substance present in the region (3) is a gas, but in the present invention, it is a high-pressure gas whose pressure is ½ or higher than the critical pressure (e.g., ½ Pc or higher).

A substance used in the state of the compressive fluid includes, for example, carbon monoxide, carbon dioxide, dinitrogen oxide, nitrogen, methane, ethane, propane, 2,3-dimethylbutane, and ethylene. Among them, carbon dioxide is preferable because the critical pressure and critical temperature of carbon dioxide are respectively about 7.4 MPa, and about 31° C., and thus a supercritical state of carbon dioxide is easily formed. In addition, carbon dioxide is non-flammable, and therefore it is easily handled. These compressive fluids may be used independently, or in combination.

In the case where supercritical carbon dioxide is used as a solvent, it has been conventionally considered that carbon dioxide is not suitable for living anionic polymerization, as it may react with basic and nucleophilic substances (see "The Latest Applied Technology of Supercritical Fluid (*CHO RIN-KAI RYUTAI NO SAISHIN OUYOU GIJUTSU*)," p. 173, published by NTS Inc. on Mar. 15, 2004). The present inventors, however, have found that, overturning the conventional insight, a polymerization reaction progresses quantitatively by stably coordinating a basic and nucleophilic organic catalyst free from a metal atom with a ring-opening monomer to open the ring structure thereof, and as a result, the polymerization reaction progresses livingly. In the present specification, the term "living" means that the reaction progresses quantitatively without a side reaction such as a transfer reaction or termination reaction, so that a molecular weight distribution of an obtained polymer is relatively narrow compared to that of the polymer obtained by melt polymerization, and is monodispersible.

(Device for Producing a Polymer)

The device for producing a polymer of the present embodiment contains a reaction section through which a compressive fluid passes, where the reaction section contains: a monomer inlet disposed at an upstream side of the reaction section, and configured to introduce a ring-opening polymerizable monomer; a catalyst inlet disposed at a downstream side of the reaction section with respect to the monomer inlet, and configured to introduce a catalyst; and a polymer outlet disposed at a downstream side of the reaction section with respect to the catalyst inlet, and configured to discharge a polymer obtained through polymerization of the ring-opening polymerization monomer. The device for producing a polymer may further contain other members, if necessary.

The aforementioned method for producing a polymer can be suitably carried out by the device for producing a polymer.

Moreover, the device for producing a polymer is preferably a tubular device for continuous production of a polymer, which has a compressive fluid inlet for introducing a compressive fluid at one end of the device and a monomer inlet for introducing a ring-opening polymerizable monomer at one end of the device, has a polymer outlet for discharging a polymer obtained through polymerization of the ring-opening polymerizable monomer at the other end of the device, and has a catalyst inlet for introducing a catalyst between the aforementioned one end and the other end of the device.

Figure 3:
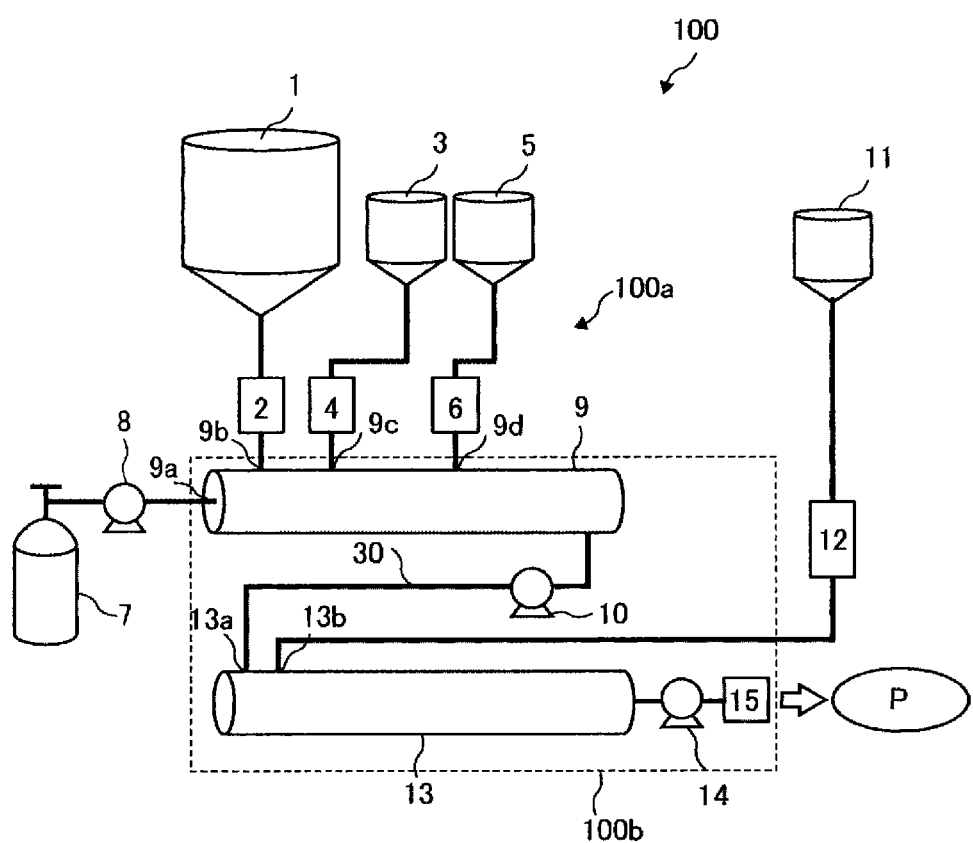
FIG. 3 is a system diagram illustrating one example of the polymerization step in the present embodiment.
Figure 4:
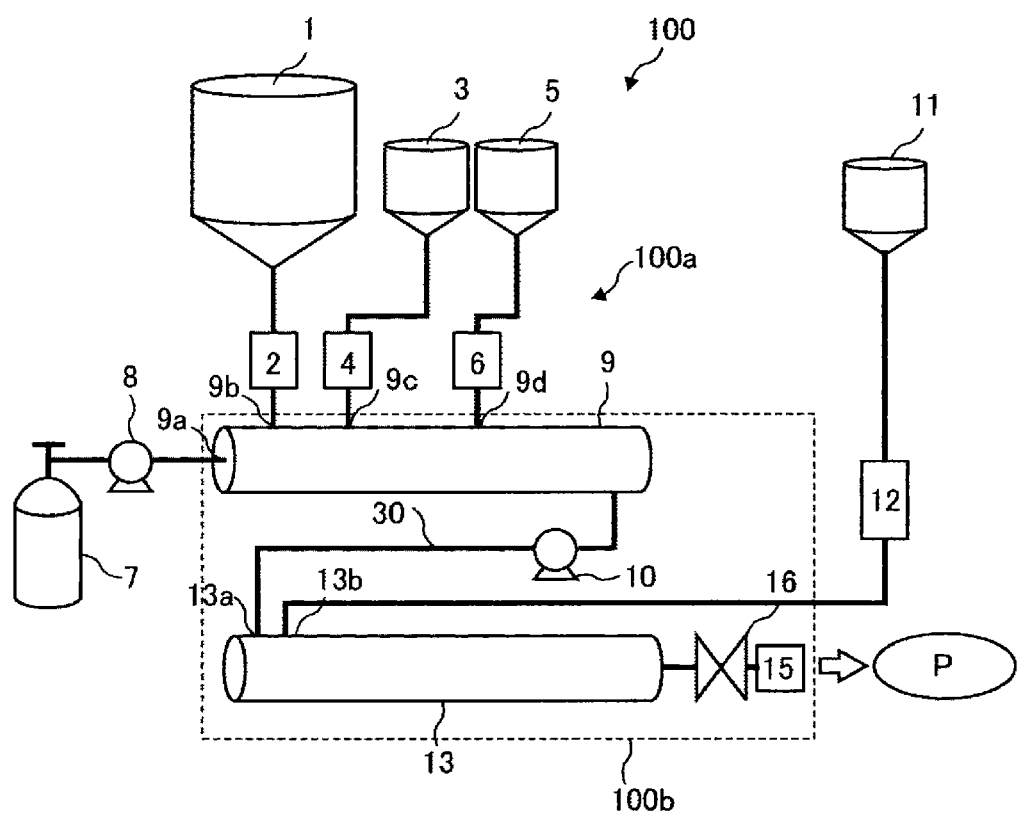
FIG. 4 is a system diagram illustrating one example of the polymerization step in the present embodiment.

A polymerization reactor including a device for producing a polymer for use in the present embodiment will be explained with reference to FIGS. 3 and 4. FIGS. 3 and 4 are each a system diagram illustrating one example of the polymerization step in the present embodiment. In the system diagram of FIG. 3, the polymerization reactor 100 contains: a supply unit 100*a* for supplying raw materials, such as a ring-opening polymerizable monomer, and a compressive fluid; and a main body of the polymerization reactor 100 *b*, which is one example of the device for producing a polymer, and is configured to allow the ring-opening polymerizable monomer supplied by the supply unit 100*a* to carry out polymerization. The supply unit 100*a* contains tanks (1, 3, 5, 7, 11), metering feeders (2, 4), and metering pumps (6, 8, 12). The main body of polymerization reactor 100*b* contains a contact section 9 provided at one end of the main body of polymerization reactor 100*b*, a liquid transfer pump 10, a reaction section 13, a metering pump 14, and a discharge nozzle 15 provided at the other end of the main body of polymerization reactor 100*b*.

The tank 1 of the supply unit 100*a* stores the ring-opening polymerizable monomer. The ring-opening polymerizable monomer to be stored may be a powder, or in the liquid state. The tank 3 stores solid (powderous or granular) materials among the initiator and additives. The tank 5 stores liquid materials among the initiator and additives. The tank 7 stores the compressive fluid. Note that, the tank 7 may store a gas or solid that becomes a compressive fluid by application of heat or pressure during the process of supplying to the contact section 9, or in the contact section 9. In this case, the gas or solid stored in the tank 7 may be formed in the state of (1), (2), or (3) depicted in the phase diagram of FIG. 2, within the contact section 9 upon application of heat or pressure.

The metering feeder 2 measures the ring-opening polymerizable monomer stored in the tank 1 and continuously supplies the measured ring-opening polymerizable monomer to the contact section 9. The metering feeder 4 measures the solid materials stored in the tank 3 and continuously supplies the measured solid materials to the contact section 9. The metering pump 6 measures the liquid materials stored in the tank 5 and continuously supplies the measured liquid materials to the contact section 9. The metering pump 8 continuously supplies the compressive fluid stored in the tank 7 at the constant pressure and flow rate into the contact section 9. Note that, in the present embodiment, "continuously supply" is a concept in contrast to a method for supplying per batch, and means supplying a respective material in the manner that a polymer polymerized by ring-opening polymerization is continuously obtained. Namely, each material can be supplied intermittently, as long as a polymer polymerized by ring-opening polymerization can be continuously obtained. In the case where the initiator and additives are all solids, the polymerization reactor 100 may not contains the tank 5 and metering pump 6. Similarly, in the case where the initiator and additives are all liquids, the polymerization reactor 100 may not contain the tank 3 and metering feeder 4.

In the present embodiment, a polymerization reaction device 100*b* is a tubular device having a monomer inlet for introducing a ring-opening polymerizable monomer, which is disposed at one end of the device, and having a polymer outlet discharging a polymer obtained through polymerization of the ring-opening polymerizable monomer, which is disclosed at the other end of the device. Further, at the one end of the polymerization reaction device 100*b*, a compressive fluid inlet for introducing a compressive fluid is further provided, and a catalyst inlet for introducing a catalyst is provided between the one end and the other end of the device. The devices equipped with the main body of polymerization reactor 100*b* are each connected through a pressure resistant pipe 30 for transporting the raw materials, compressive fluid, or polymer product, as illustrated in FIG. 3. Moreover, each device of the contact section 9, liquid transfer pump 10 and reaction section 13 of the polymerization reactor contains a tubular member for passing the raw materials through.

The contact section 9 of the main body of polymerization reactor 100*b* is a device contains a pressure resistant device or a tube configured to continuously bring the raw materials (e.g. the ring-opening polymerizable monomer, initiator, and additives) supplied from the tanks (1, 3, 5) into contact with the compressive fluid supplied from the tank 7, to thereby melt the raw materials therein. In the contact section 9, the raw materials are melted or dissolved by bringing the raw materials into contact with a compressive fluid. In the present embodiment, the term "melt" means that raw materials or a generated polymer is plasticized or liquidized with swelling as a result of the contact between the raw materials or generated polymer, and the compressive fluid. Moreover, the term "dissolve" means that the raw materials are dissolved in the compressive fluid. When the ring-opening polymerizable monomer is dissolved, a fluid phase is formed. When the ring-opening polymerizable monomer is melted, a molten phase is formed. It is however preferred that a molten phase or fluid phase be formed with one phase in order to uniformly carry out a reaction. Moreover, it is preferred that the ring-opening polymerizable monomer be melted in order to carry out a reaction with a high ratio of the raw materials relative to the compressive fluid. In accordance with the present embodiment, the raw materials, such as a ring-opening polymerizable monomer, and a compressive fluid can be continuously brought into contact with each other at a constant concentration rate in the contact section 9 by continuously supplying the raw material and the compressive fluid. As a result, the raw materials are efficiently melted or dissolved.

The contact section 9 may be composed of a tank-shape device, or a tubular device, but it is preferably a tube from one end of which the raw materials are supplied and from the other end of which the mixture, such as a molten phase and a fluid phase, is taken out. Further, the contact section 9 may contain a stirring device for stirring the raw materials, and compressive fluid. In the case where the contact section 9 contains a stirring device, the stirring device is preferably a single screw stirring device, a twin-screw stirring device where screws are engaged with each other, a biaxial mixer containing a plurality of stirring elements which are engaged or overlapped with each other, a kneader containing spiral stirring elements which are engaged with each other, or a stick mixer. Among them, the two-axial or multi-axial stirrer stirring elements of which are engaged with each other is more preferable because there is generated a less amount of the depositions of the reaction product onto the stirrer or container, and it has self-cleaning properties. In the case where the contact section 9 does not contain a stirring device, the contact section 9 is preferably partially composed of a pressure resistant pipe 30. Note that, in the case of the contact section 9 composed of the pipe 30, the ring-opening polymerizable monomer supplied to the contact section 9 is preferably turned into the liquid state in advance to surely mix all the materials in the contact section 9.

The contact section 9 is provided with an inlet 9a for introducing a compressive fluid supplied from the tank 7 by the metering pump 8, an inlet 9b for introducing the ring-opening polymerizable monomer supplied from the tank 1 by the metering feeder 2, an inlet 9c for introducing the powder supplied from the tank 3 by the metering feeder 4, and an inlet 9d for introducing the liquid supplied from the tank 5 by the metering pump 6. In the present embodiment, each inlet (9a, 9b, 9c, 9d) is composed of a connector for connecting the container of the contact section 9 with each pipe for transporting each of the raw materials or compressive fluid. The connector is not particularly limited, and is selected from conventional reducers, couplings, Y, T, and outlets. The contact section 9, moreover, contains a heater 9e for heating each of the supplied raw materials and compressive fluid.

The liquid transfer pump 10 send the mixture, such as a molten phase or a fluid phase formed in the contact section 9, to the reaction section 13. The tank 11 stores a catalyst. The metering pump 12 measures the catalyst stored in the tank 11 and supply the measured catalyst to the reaction section 13.

The reaction section 13 is composed of a pressure resistant device or tube for mixing the melted raw materials sent by the liquid transfer pump 10, with the catalyst supplied by the metering pump 12, to thereby carry out ring-opening polymerization of the ring-opening polymerizable monomer. The reaction section 13 may be composed of a tank-shaped device or a tubular device, but it is preferably a tubular device as it gives a less dead space. Further, the reaction section 13 may contain a stirrer for stirring the raw materials, and compressive fluid. The stirrer of the reaction section 13 is preferably a dual- or multi-axial stirrer having screws engaging with each other, stirring elements of 2-flights (ellipse), stirring elements of 3-flights (triangle), or circular or multi-leaf shape (clover shape) stirring wings, in view of self-cleaning. In the case where raw materials including the catalyst are sufficiently mixed in advance, a motionless mixer, which divides the flow and compounds (recombines the flows in multiple stages), can also be used as a stirrer. Examples of the motionless mixer include: multiflux batch mixers disclosed in Japanese examined patent application publication (JP-B) Nos. 47-15526, 47-15527, 47-15528, and 47-15533; a Kenics-type (static) mixer disclosed in JP-A No. 47-33166; and motionless mixers similar to those listed without a moving part. In the case where the reaction section 13 is not equipped with a stirrer, the reaction section 13 is composed of a part of a pressure resistant pipe 30. In this case, a shape of the pipe is not particularly limited, but it is preferably a spiral shape in view of downsizing of a device.

The reaction section 13 is provided with an inlet 13a for introducing the raw materials dissolved or melted in the contact section 9, and an inlet 13b, as one example of a catalyst inlet, for introducing the catalyst supplied from the tank 11 by the metering pump 12. In the present embodiment, each inlet (13a, 13b) is composed of a connector for connecting a tubular member, such as a part of a cylinder or pipe 30 for passing therein the raw materials through to the reaction section 13, with pipes for supplying the raw materials or compressive fluid. The connector is not particularly limited, and is selected from those known in the art, such as reducers, couplings, Y, T, and outlets. Note that, the reaction section 13 may be provided with a gas outlet for releasing evaporated materials. Moreover, the reaction section 13 contains a heater 13c for heating the transported raw materials.

FIG. 3 illustrates an embodiment where one reaction section 13 is used, but the polymerization reaction device 100 may contain two or more reaction sections 13. In the case where a plurality of reaction sections 13 are contained, the reaction (polymerization) conditions per reaction section 13, i.e., conditions, such as the temperature, concentration of the catalyst, the pressure, the average retention time, and stirring speed, can be the same as in the case only one reaction section 13 is used, but they are preferably optimized per reaction section 13 corresponding to the progress of the polymerization (the stage of the polymerization). Note that, it is not very good idea that excessively large number of reaction sections 13 is connected to give many stages, as it may extend a reaction time, or a device may become complicated. The number of stages is preferably 1 to 4, more preferably 1 to 3.

In the case where polymerization is performed with only one reaction section, a polymerization degree of an obtained polymer or an amount of monomer residues in the polymer are generally unstable, and tend to be varied, and therefore it is not suitable in industrial productions. It is thought that the instability thereof is caused because raw materials having the melt viscosity of a few poises to several tends poises and the polymerized polymer having the melt viscosity of approximately 1,000 poises are present together. In the present embodiment, compared to the above, the viscosity difference in the reaction section 13 (also referred to as a polymerization system) can be reduced, as the raw materials and polymer product are melted (liquidized). Therefore, a polymer can be stably produced even when the number of stages is reduced compared to that in the conventional polymerization reactor.

The metering pump 14 discharges the polymer product P polymerized in the reaction section 13 from a discharge nozzle 15, which is one example of a polymer outlet, to the outside of the reaction section 13. Alternatively, the polymer product P may be discharged from the reaction section 13 by utilizing a pressure difference between the inside and outside of the reaction section 13, without using the metering pump 14. In this case, instead of the metering pump 14, a pressure adjustment valve 16 may be used, as illustrated in FIG. 4, so as to adjust an internal pressure of the reaction section 13 or a discharging amount of the polymer product P.

[Polymerization Step]

Subsequently, a polymerization step of a ring-opening polymerizable monomer using a polymerization reactor 100 will be explained. In the present embodiment, a ring-opening polymerizable monomer and compressive fluid are continuously supplied and brought into contact with each other, and are allowed to carry out ring-opening polymerization of the ring-opening polymerization monomer, to thereby continuously generate a polymer. First, each of the metering feeders (2, 4), the metering pump 6, and the metering pump 8 is operated to continuously supply a ring-opening polymerizable monomer, initiator, additives, and compressive fluid in the tanks (1, 3, 5, 7).

As a result, the raw materials and compressive fluid are continuously introduced into the pipe of the contact section 9 from respective inlets (9a, 9b, 9c, 9d). Note that, the weight accuracy of solid (powder or granular) raw materials may be low compared to that of the liquid raw materials. In this case, the solid raw materials may be melted into a liquid to be stored in the tank 5, and then introduced into the tube of the contact section 9 by the metering pump 6. The order for operating the metering feeders (2, 4) and the metering pump 6 and metering pump 8 are not particularly limited, but it is preferred that the metering pump 8 be operated first because there is a possibility that raw materials are solidified if the initial raw materials are sent to the reaction section 13 without being in contact with the compressive fluid.

The speed for feeding each of the raw materials by the respective metering feeder (2, 4) or metering pump 6 is adjusted based on the predetermined mass ratio of the ring-opening polymerizable monomer, initiator, and additives so that the mass ratio is kept constant. A total mass of each of the raw material supplied per unit time by the metering feeder (2, 4) or metering pump 6 (the feeding speed of the raw materials (g/min)) is adjusted based on desirable physical properties of a polymer or a reaction time. Similarly, a mass of the compressive fluid supplied per unit time by the metering pump 8 (the feeding speed of the compressive fluid (g/min)) is adjusted based on desirable physical properties of a polymer or a reaction time. A ratio (the feeding speed of the raw materials/the feeding speed of the compressive fluid) of the feeding speed of the raw material to the feeding speed of the compressive fluid, so called a feeding ratio, is preferably 1 or more, more preferably 3 or more, even more preferably 5 or more, and further more preferably 10 or more. The upper limit of the feeding ratio is preferably 1,000 or lower, more preferably 100 or lower, and even more preferably 50 or lower.

By setting the feeding ratio to 1 or greater, a reaction progresses with the high concentration of the raw materials and a polymer product (i.e., high solid content) when the raw materials and the compressive fluid are sent to the reaction section 13. The solid content in the polymerization system here is largely different from a solid content in a polymerization system where polymerization is performed by dissolving a small amount of a ring-opening polymerizable monomer in a significantly large amount of a compressive fluid in accordance with a conventional production method. The production method of the present embodiment is characterized by that a polymerization reaction progresses efficiently and stably in a polymerization system having a high solid content. Note that, in the present embodiment, the feeding ratio may be set to less than 1. In this case, quality of a polymer product has no problem, but economical efficiency is not satisfactory. When the feeding ratio is greater than 1,000, there is a possibility that the compressive fluid may not sufficiently dissolve the ring-opening polymerizable monomer therein, and the intended reaction does not uniformly progress.

Since the raw materials and the compressive fluid are each continuously introduced into the tube of the contact section 9, they are continuously brought into contact with each other. As a result, each of the raw materials, such as the ring-opening polymerizable monomer, the initiator, and the additives, are dissolved or melted in the contact section 9. In the case where the contact section 9 contains a stirrer, the raw materials and compressive fluid may be stirred. In order to prevent the introduced compressive fluid from turning into gas, the internal temperature and pressure of the tube of the reaction section 13 are controlled to the temperature and pressure both equal to or higher than at least a triple point of the compressive fluid. The control of the temperature and pressure here is performed by adjusting the output of the heater 9e of the contact section 9, or adjusting the feeding speed of the compressive fluid. In the present embodiment, the temperature for melting the ring-opening polymerizable monomer may be the temperature equal to or lower than the melting point of the ring-opening polymerizable monomer under atmospheric pressure. It is assumed that the internal pressure of the contact section 9 becomes high under the influence of the compressive fluid so that the melting point of the ring-opening polymerizable monomer reduces the melting point thereof under the atmospheric pressure. Accordingly, the ring-opening polymerizable monomer is melted in the contact section 9, even when an amount of the compressive fluid is small with respect to the ring-opening polymerizable monomer.

In order to melt each of the raw materials efficiently, the timing for applying heat to or stirring the raw materials and compressive fluid in the contact section 9 may be adjusted. In this case, heating or stirring may be performed after bringing the raw materials and compressive fluid into contact with each other, or heating or stirring may be performed while bringing the raw materials and compressive fluid into contact with each other. To ensure melting of the materials, for example, the ring-opening polymerizable monomer and the compressive fluid may be brought into contact with each other after heating the ring-opening polymerizable monomer at the temperature equal to or higher than the melting point thereof. In the case where the contact section 9 is a biaxial mixing device, for example, each of the aforementioned aspects may be realized by appropriately setting an alignment of screws, arrangement of inlets (9a, 9b, 9c, 9d), and temperature of the heater 9e.

In the present embodiment, the additives are supplied to the contact section 9 separately from the ring-opening polymerizable monomer, but the additives may be supplied together with ring-opening polymerizable monomer. Alternatively, the additives may be supplied after completion of a polymerization reaction. In this case, after taking the obtained polymer product out from the reaction section 13, the additive may be added to the polymer product while kneading the mixture of the additives and polymer product.

The raw materials dissolved or melted in the contact section 9 are each sent by the liquid transfer pump 10, and supplied to the reaction section 13 through the inlet 13a. Meanwhile, the catalyst in the tank 11 is measured, a predetermined amount of which is supplied by the metering pump 12 to the reaction section 13 through the inlet 13b. The catalyst can function even at room temperature, and therefore, in the present embodiment, the catalyst is added after melting the raw materials in the compressive fluid. In the conventional art, the timing for adding the catalyst has not been discussed in association with the ring-opening polymerization of the ring-opening polymerizable monomer using the compressive fluid. In the present embodiment, in the course of the ring-opening polymerization, the catalyst is added to the polymerization system in the reaction section 13 because of the high activity of the organic catalyst, where the polymerization system contains a mixture of raw materials such as the ring-opening polymerizable monomer and the initiator, sufficiently dissolved or melted in the compressive fluid. When the catalyst is added in the state where the mixture is not sufficiently dissolved or melted, a reaction may unevenly progress.

The raw materials each sent by the liquid transfer pump 10 and the catalyst supplied by the metering pump 12 are sufficiently stirred by a stirrer of the reaction section 13, or heated by a heater 13c to the predetermined temperature when transported. As a result, ring-opening polymerization reaction of the ring-opening polymerizable monomer is carried out in the reaction section 13 in the presence of the catalyst (polymerization step).

The lower limit of the temperature for ring-opening polymerization of the ring-opening polymerizable monomer (polymerization reaction temperature) is not particularly limited, but it is 40° C., preferably 50° C., and even more preferably 60° C. When the polymerization reaction temperature is lower than 40° C., it may take a long time to melt the ring-opening polymerizable monomer in the compressive fluid, depending on the type of the ring-opening polymerizable monomer, or melting of the ring-opening polymerizable monomer may be insufficient, or the activity of the catalyst may be low. As a result, the reaction speed may be reduced during the polymerization, and therefore it may not be able to proceed to the polymerization reaction quantitatively.

The upper limit of the polymerization reaction temperature is not particularly limited, but it is either 100° C., or temperature that is higher than the melting point of the ring-opening polymerizable monomer by 30° C., whichever higher. The upper limit of the polymerization reaction temperature is preferably 90° C., or the melting point of the ring-opening polymerizable monomer, whichever higher. The upper limit of the polymerization reaction temperature is more preferably 80° C., or temperature that is lower than the melting point of the ring-opening polymerizable monomer by 20° C., whichever higher. When the polymerization reaction temperature is higher than the aforementioned temperature, which is higher than the melting point of the ring-opening polymerizable monomer by 30° C., a depolymerization reaction, which is a reverse reaction of ring-opening polymerization, tends to be caused equilibrately, and therefore the polymerization reaction is difficult to proceed quantitatively. In the case where a ring-opening monomer having low melting point, such as a ring opening polymerizable monomer that is liquid at room temperature, is used, the polymerization reaction temperature may be temperature that is higher than the melting point by 30° C. to enhance the activity of the catalyst. In this case, however, the polymerization reaction temperature is preferably 100° C. or lower. Note that, the polymerization reaction temperature is controlled by a heater 13c equipped with the reaction section 13, or by externally heating the reaction section 13. When the polymerization reaction temperature is measured, a polymer product obtained by the polymerization reaction may be used for the measurement.

In a conventional production method of a polymer using supercritical carbon dioxide, polymerization of a ring-opening polymerizable monomer is carried out using a large amount of supercritical carbon dioxide as supercritical carbon dioxide has low ability of dissolving a polymer. In accordance with the polymerization method of the present embodiment, ring-opening polymerization of a ring-opening polymerizable monomer is performed with a high concentration, which has not been realized in a conventional art, in the course of production of a polymer using a compressive fluid. In the present embodiment, the internal pressure of the reaction section 13 becomes high under the influence of the compressive fluid, and thus glass transition temperature (Tg) of a polymer product becomes low. As a result, the produced polymer product has low viscosity, and therefore a ring-opening reaction uniformly progresses even in the state where the concentration of the polymer product is high.

In the present embodiment, the polymerization reaction time (the average retention time in the reaction section 13) is appropriately set depending on a target molecular weight of a polymer product to be produced. Generally, the polymerization reaction time is preferably within 1 hour, more preferably within 45 minutes, and even more preferably within 30 minutes. The production method of the present embodiment can reduce the polymerization reaction time to 20 minutes or shorter. This polymerization reaction time is short, which has not been realized before in polymerization of a ring-opening polymerizable monomer in a compressive fluid.

The pressure for the polymerization, i.e., the pressure of the compressive fluid, may be the pressure at which the compressive fluid supplied by the tank 7 becomes a liquid gas ((2) in the phase diagram of FIG. 2), or high pressure gas ((3) in the phase diagram of FIG. 2), but it is preferably the pressure at which the compressive fluid becomes a supercritical fluid ((1) in the phase diagram of FIG. 2). By making the compressive fluid into the state of a supercritical fluid, melting of the ring-opening polymerizable monomer is accelerated to uniformly and quantitatively progress a polymerization reaction. In the case where carbon dioxide is used as the compressive fluid, the pressure is 3.7 MPa or higher, preferably 5 MPa or higher, more preferably 7.4 MPa or higher, which is the critical pressure or higher, in view of efficiency of a reaction and polymerization rate. In the case where carbon dioxide is used as the compressive fluid, moreover, the temperature thereof is preferably 25° C. or higher from the same reasons to the above.

The moisture content in the reaction section 13 is preferably 4 mol % or less, more preferably 1 mol % or less, and even more preferably 0.5 mol % or less, relative to 100 mol % of the ring-opening polymerizable monomer. When the moisture content is greater than 4 mol %, it may be difficult to control a molecular weight of a resulting product as the moisture itself acts as an initiator. In order to control the moisture content in the polymerization system, an operation for removing moistures contained in the ring-opening polymerizable monomer and other raw materials may be optionally provided as a pretreatment.

The polymer product P completed the ring-opening polymerization reaction in the reaction section 13 is discharged outside the reaction section 13 by means of the metering pump 14. The speed for discharging the polymer product P by the metering pump 14 is preferably constant so as to keep the internal pressure of the polymerization system filled with the compressive fluid constant, and to yield a uniform polymer product. To this end, the liquid sending system inside the reaction section 13 and the amount for sending the liquid by the liquid transfer pump 10 are controlled to maintain the back pressure of the metering pump 14 constant. Similarly, the liquid sending system inside the contact section 9, and the feeding speeds of the metering feeders (2, 4) and metering pumps (6, 8) are controlled to maintain the back pressure of the liquid transfer pump 10 constant. The control system may be an ON-OFF control system, i.e., an intermittent feeding system, but it is in most cases preferably a continuous or stepwise control system where the rational speed of the pump or the like is gradually increased or decreased. Any of these controls realizes to stably provide a uniform polymer product.

The catalyst remained in a polymer product obtained by the present embodiment is removed, if necessary. A method for removing is not particularly limited, but examples thereof include: vacuum distillation in case of a compound having a boiling point; a method for extracting and removing the catalyst using a compound dissolving the catalyst as an entrainer; and a method for absorbing the catalyst with a column to remove the catalyst. In method for removing the catalyst, a system thereof may a batch system where the polymer product is taken out from the reaction section and then the catalyst is removed therefrom, or a continuous processing system where the catalyst is removed in the reaction section 13 without taking the polymer product out of the reaction section 13. In the case of vacuum distillation, the vacuum condition is set based on a boiling point of the catalyst. For example, the temperature in the vacuum is 100° C. to 120° C., and the catalyst can be removed at the temperature lower than the temperature at which the polymer product is depolymerized. If a solvent is used in the process of extraction, it may be necessary to provide a step for removing the solvent after extracting the catalyst. Therefore, it is preferred that a compressive fluid be used as a solvent for the extraction. As for the process of such extraction, conventional techniques used for extracting perfumes may be diverted.

(Polymer Product)

The polymer product of the present embodiment is a polymer product obtained by the aforementioned method for producing a polymer of the present invention, and the polymer product of the present embodiment is substantially free from an organic solvent and a metal atom, contains ring-opening polymerizable monomer residues in an amount of less than 2 mol %, and has a number average molecular weight of 12,000 or greater.

In accordance with the production method of the present embodiment, as described above, it is possible to carry out a polymerization reaction at low temperature as a compressive fluid is used. Accordingly, a depolymerization reaction can be significantly prevented compared to a conventional melt polymerization. In the present embodiment as described, the polymerization rate is 96 mol % or greater, preferably 98 mol % or greater. When the polymerization rate is less than 96 mol %, the polymer product does not have satisfactory thermal characteristics to function as a polymer product, and therefore it may be necessary to separately provide an operation for removing a ring-opening polymerizable monomer. Note that, in the present embodiment, the polymerization rate is a ratio of the ring opening polymerizable monomer contributed to generation of a polymer, relative to the ring-opening polymerizable monomer of the raw materials. The amount of the ring-opening polymerizable monomer contributed to generation of a polymer can be obtained by deducting the amount of the unreacted ring-opening polymerizable monomer (the amount of ring-opening polymerizable monomer residues) from the amount of the generated polymer.

The polymer product is preferably a copolymer having two or more polymer segments. The polymer product is suitably produced by the first method of the second embodiment, which will be described later.

Moreover, the polymer product is preferably a stereo complex. Such polymer product is suitably produced by the first and/or second method in the second embodiment, which will be described later.

Taking stereo complex polylactic acid as an example, the term "stereo complex" means a polylactic acid composition, which contains a poly-D-lactic acid component and a poly-L-lactic acid component, and has a stereo complex crystal, where the degree of the crystallinity of stereo complex represented by the following formula (i) is 90% or higher. The stereo complex crystallinity degree (S) is determined from heat of melting a homocrystal of polylactic acid ($\Delta$Hmh) measured at temperature lower than 190° C. and heat of melting a stereo complex crystal of polylactic acid ($\Delta$Hmsc) measured at temperature of 190° C. or higher as measured by a differential scanning calorimeter (DSC) using the following formula (i):

$$(S)=[\Delta Hmsc/(\Delta Hmh+\Delta Hmsc)]\times 100 \qquad (i)$$

The number average molecular weight of the polymer product obtained in the present embodiment can be adjusted by adjusting an amount of the initiator. The number average molecular weight thereof is not particularly limited, but it is generally 12,000 to 200,000. When the number average molecular weight thereof is greater than 200,000, productivity is low because of the increased viscosity, which is not economically advantageous. When the number average molecular weight thereof is smaller than 12,000, it may not be preferable because a polymer product may have insufficient strength to function as a polymer. The value obtained by dividing the weight average molecular weight Mw of the polymer product obtained by the present embodiment with the number average molecular weight Mn thereof is preferably in the range of 1.0 to 2.5, more preferably 1.0 to 2.0. When the value thereof is greater than 2.0, it is not preferable as the polymerization reaction may have progressed non-uniformly to produce a polymer product, and therefore it is difficult to control physical properties of the polymer.

The polymer product obtained by the present embodiment is substantially free from a metal atom and an organic solvent, because it is produced by a method without using the metal catalyst and the organic solvent, and has an extremely small amount of the ring-opening polymerizable monomer residues, which is less than 4 mol % (polymerization rate of the monomer being 96 mol % or higher), preferably less than 2 mol % (polymerization rate of the monomer being 98 mol % or higher), and more preferably 0.1% by mass or lower (polymerization rate of the monomer being 99.9% by mass or higher). Note that a small amount (% by mass) of the ring-opening polymerizable monomer residues on the order of 0.1% by mass or equal to or less than 0.1% by mass can be measured and calculated from the peak area corresponding to the ring-opening polymerizable monomer residues obtained through gas chromatography (CG). Therefore, the polymer product obtained by the present embodiment is excellent in safety and stability. Accordingly, polymer particles obtained in the present embodiment is widely applied in uses such as daily use products, pharmaceutical products, cosmetic products, and electrophotographic toners. Note that, in the present embodiment, the term "metal catalyst" represents a catalyst generally used for ring-opening polymerization, and containing a metal. The phrase "substantially free from a metal atom" means that an amount of a metal atom in a polymer product is a detection limit or lower when the amount thereof is detected by a conventional analysis method, such as ICP-AES, atomic absorption spectrophotometry, and colorimetry. In the present embodiment, moreover, the term "organic solvent" means an organic solvent generally used for ring-opening polymerization. The phrase "substantially free from an organic solvent" means an amount of an organic solvent in a polymer product is a detection limit or lower when the amount thereof is measured by the following measuring method.

[Measuring Method of Residual Organic Solvent]

To 1 part by mass of a polymer product that is a subject of a measurement, 2 parts by mass of 2-propanol is added, and the resulting mixture is dispersed for 30 minutes by applying ultrasonic waves, followed by storing the resultant over 1 day or longer in a refrigerator (5° C.) to thereby extract the organic solvent in the polymer product. A supernatant liquid thus obtained is analyzed by gas chromatography (GC-14A, SHIMADZU) to determine quantities of organic solvent and monomer residues in the polymer product, to thereby measure a concentration of the organic solvent. The measuring conditions for the analysis are as follows:

Device: SHIMADZU GC-14A
Column: CBP20-M 50-0.25
Detector: FID
Injection amount: 1 µL to 5 µL
Carrier gas: He, 2.5 kg/cm$^2$
Flow rate of hydrogen: 0.6 kg/cm$^2$
Flow rate of air: 0.5 kg/cm$^2$
Chart speed: 5 mm/min
Sensitivity: Range 101×Atten 20
Temperature of column: 40° C.
Injection temperature: 150° C.

<<Use of Polymer Product>>

The polymer product obtained by the production method of the present embodiment is excellent in safety and stability because it is produced by the method which does not use a metal catalyst and an organic solvent, and there are hardly any monomer residues therein. Accordingly, the polymer product obtained by the production method of the present embodiment is widely applied for various uses, such as an electrophotographic developer, a printing ink, paints for building, cosmetic products, and medical materials. When the polymer product is used in the aforementioned uses, various additives may be added to the polymer product to improve molding ability, secondary processability, degradability, tensile strength, thermal resistance, storage stability, crystallinity, and weather resistance.

[Second Embodiment](Applied Example)

Subsequently, a second embodiment, which is an applied example of the first embodiment, will be explained. In the production method of the first embodiment, a reaction progresses quantitatively with hardly any monomer residue. Accordingly, a first method of the second embodiment uses the polymer product produced by the production method of the first embodiment, and synthesizes a complex by appropriately setting timing for adding one or more ring-opening polymerizable monomers. Moreover, a second method of the second embodiment uses two or more polymer products including a polymer product produced by the production method of the first embodiment, and forms a complex by continuously mixing the two or more polymer products in the presence of a compressive fluid. Note that, in the present embodiment, the term "complex" means a copolymer having two or more polymer segments obtained by polymerizing monomers with a plurality of systems, or a mixture of two or more polymers obtained by polymerizing monomers with a plurality of systems.

Two synthesis methods of a stereo complex are described as examples of the complex, hereinafter.

<First Method and Device>

The method for producing a polymer, which is a first method of the second embodiment, contains the polymerization step (first polymerization step), and a second polymerization step, which is continuously bringing the first polymer obtained through ring-opening polymerization of the first ring-opening monomer in the first polymerization step into contact with a second ring-opening polymerizable monomer, to thereby allow the first polymer and the second ring-opening polymerizable monomer to carry out polymerization. The method may further contain other steps, if necessary.

The device for producing a complex, which is a first device of the second embodiment, contains the device for producing a polymer and a second reaction section through which a compressive fluid passes, where the second reaction section contains: a second monomer inlet and a first polymer inlet, both disposed at an upper stream side of the second reaction section, where the second monomer inlet is configured to introduce a second ring-opening polymerizable monomer, and the first polymer inlet is configured to introduce a first polymer discharged from the polymer outlet of the device for producing a polymer; a second catalyst inlet disposed at a downstream side of the second reaction section with respect to the second monomer inlet, and configured to introduce a second catalyst; and a complex outlet disposed at a downstream side of the second reaction section with respect to the second catalyst inlet, and configured to discharge a complex obtained through polymerization of the first polymer with the second ring-opening polymerizable monomer. The device may further contain other members, if necessary.

The aforementioned method for producing a polymer is suitably carried out by the device for producing a complex.

The device for producing a complex is preferably a tubular device for continuous production of a complex, in which the second reaction section is a tubular reaction section having a second monomer inlet and a polymer inlet at one end (upstream side) of the reaction section, having a complex outlet at the other end, and having a second catalyst inlet between the aforementioned one end and the other end of the reaction section, where the second monomer inlet is configured to introduce a second ring-opening polymerizable monomer, the polymer inlet is configured to introduce the first polymer discharged from the polymer outlet of the device for producing a polymer, the complex outlet is configured to discharge a complex obtained through polymerization between the first polymer and the second ring-opening polymerizable monomer, and the second catalyst inlet is configured to introduce a second catalyst; the device for producing a polymer is the tubular device for continuous production of a polymer; and the polymer inlet is connected with the polymer outlet of the device for continuous production of a polymer.

The first ring-opening polymerizable monomer and second ring-opening polymerizable monomer are appropriately selected from those described as the ring-opening polymerizable monomer above depending on the intended purpose without any limitation. They may be different or same ring-opening polymerizable monomers. For example, a stereo complex can be formed by using monomers, which are optical isomers to each other, as the first ring-opening polymerizable monomer and second ring-opening polymerizable monomer.

The first catalyst and second catalyst are appropriately selected from those described as the catalyst above depending on the intended purpose without any limitation, and they may be the same or different from each other.

Figure 5A:
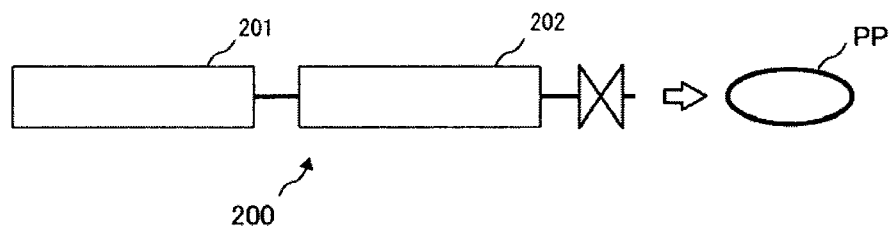
FIGS. 5A and 5B are schematic diagrams each illustrating a complex production system 200 for use in the first method of the present embodiment.
Figure 5B:
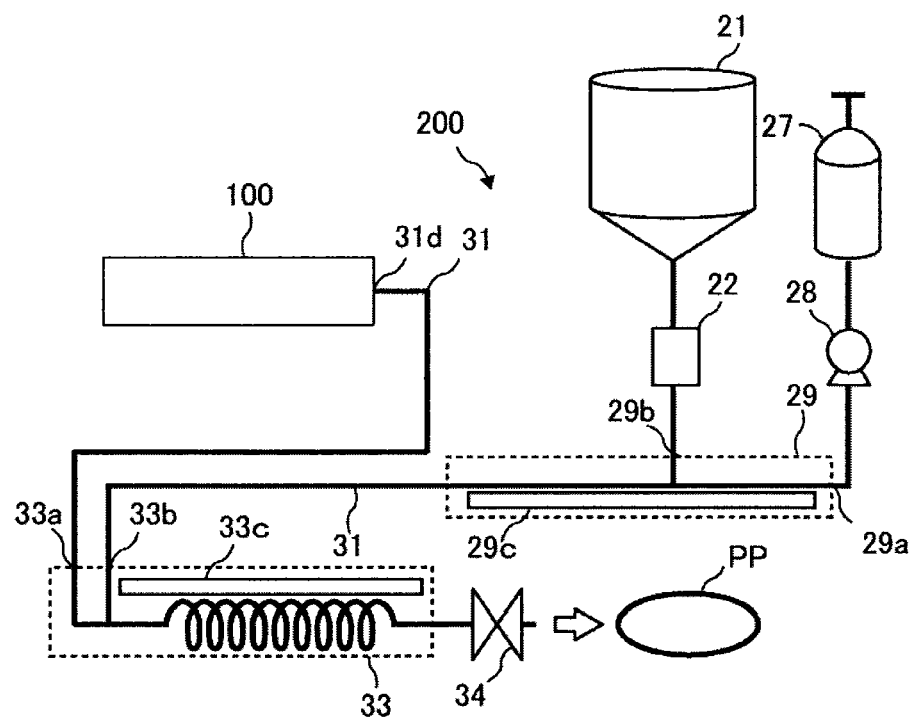

First, the first method will be explained with reference to FIGS. 5A and 5B. FIGS. 5A and 5B are each a schematic diagram illustrating a complex production system for use in the first method. The first method contains a mixing step, which includes continuously mixing a plurality of polymers containing the polymer obtained by the production method of the first embodiment, in the presence of a compressive fluid. Specifically, a polymer is produced in System 1 (reference 201 in the diagram) in the complex production system 200 of FIG. 5A in accordance with the production method of the first embodiment, to thereby obtain a polymer product P. The polymer product P and a newly introduced second ring-opening polymerizable monomer are brought into contact with each other in System 2 (reference 202 in the diagram) in the presence of the compressive fluid, and continuously mixed to thereby produce a complex product PP (a final polymer product). Note that, a complex product PP having three or more segments may be obtained by tandemly repeating a system similar to System 2 in the complex production system 200 of FIG. 5A.

Subsequently, specific example of a complex production system 200 will be explained with reference to FIG. 5B. The complex production system 200 contains a polymerization reactor 100, which is similar to the one used in the first embodiment, tanks (21, 27), a metering feeder 22, a metering pump 28, a contact section 29, a reaction section 33, and a pressure adjustment valve 34.

In the complex production system 200, the reaction section 33 is composed of a tube or tubular device having a polymer inlet 33a at one end, and a complex outlet at the other end, where the polymer inlet 33a is configured to introduce a plurality of polymers, and the discharge outlet is configured to discharge a complex obtained by mixing the polymers. The polymer inlet 33a of the reaction section 33 is connected with an outlet of the polymerization reactor 100 via the pressure resistant pipe 31. The outlet of the polymerization reactor 100 means an outlet of a pipe or edge of a cylinder of the reaction section 13, metering pump 14 (FIG. 3), or pressure adjustment valve 16 (FIG. 4). In any case, the polymer product P generated in each of the polymerization reactors 100 can be supplied to the reaction section 33 in the dissolved or melted state without turning back to the atmospheric pressure.

The tank 21 stores a second ring-opening polymerizable monomer. Note that, in the first method, the second ring-opening polymerizable monomer is an optical isomer of the ring-opening polymerizable monomer stored in the tank 1. The tank 27 stores a compressive fluid. The compressive fluid stored in the tank 27 is not particularly limited, but it is preferably the same to the compressive fluid stored in the tank 7 to proceed to a polymerization reaction uniformly. Note that, the tank 27 may store a gas or solid that is formed into a compressive fluid by applying heat or pressure during when it is supplied to the contact section 29, or in the contact section 29. In this case, the gas or solid stored in the tank 27 may become in the state of (1), (2), or (3) in the phase diagram of FIG. 2 in the contact section 29 upon application of heat or pressure.

The metering feeder 22 measures the second ring-opening polymerizable monomer stored in the tank 21, and continuously supplies the second ring-opening polymerizable monomer to the contact section 29. The metering pump 28 continuously supplies the compressive fluid stored in the tank 27 to the contact section 29 with constant pressure and flow rate.

The contact section 29 is composed of a pressure resistant device or tube for continuously bringing the second ring-opening polymerizable monomer supplied from the tank 21 into contact with the compressive fluid supplied from the tank 27, and dissolving or melting the raw materials therein. The container of the contact section 29 is provided with an inlet 29a for introducing the compressive fluid supplied from the tank 27 by the metering pump 28, and an inlet 29b for introducing the second ring-opening polymerizable monomer supplied from the tank 21 by the metering feeder 22. Moreover, the contact section 29 is provided with a heater 29c for heating the supplied second ring-opening polymerizable monomer and compressive fluid. Note that, in the present embodiment, a device or tube similar to the contact section 9 is used as the contact section 29.

The reaction section 33 is composed of a pressure resistant device or tube for polymerizing a polymer product P, which is produced through polymerization performed in the polymerization reactor 100 and is an intermediate product in the state being dissolved or melted in the compressive fluid, with the second ring-opening polymerizable monomer dissolved or melted in the compressive fluid in the contact section 29. The reaction section 33 is provided with an inlet 33a for introducing the polymer product P, which is the dissolved or melted intermediate product, into the tube, and an inlet 33b for introducing the dissolved melted second ring-opening polymerizable monomer into the tube. Moreover, the reaction section 33 is provided with a heater 33c for heating the transported polymer product P and second ring-opening polymerizable monomer. Note that, in the present embodiment, the one similar to the reaction section 13 is used as the reaction section 33. The pressure adjustment valve 34, as one example of the complex outlet, sends the complex product PP polymerized in the reaction section 33 out of the reaction section 33 by utilizing a difference between internal pressure and external pressure of the reaction section 33.

In the first method, the ring-opening polymerizable monomer (e.g., L-lactide) is polymerized in the reaction section 13, and after completing the reaction quantitatively, an optical isomer (e.g., D-lactide) of the ring-opening polymerizable monomer, which is one example of the second ring-opening polymerizable monomer, is added to the reaction section 33 to further carry out a polymerization reaction. As a result, a stereo block copolymer is obtained. This method is effective because recemization hardly occurs, because the reaction is carried out at the temperature equal to or lower than the melting point of the ring-opening polymerizable monomer with the state where there are fewer monomer residues, and because a complex is produced by a reaction of one stage.

<Second Method and Device>

The method for producing a polymer, which is a second method of the second embodiment, contains the polymerization step, and a mixing step, and may further contain other steps. The mixing step is continuously mixing two or more polymers including the polymer obtained in the polymerization step in the presence of the compressive fluid.

It is preferred that the two or more polymer contain a first polymer obtained by ring-opening polymerization of a first ring-opening polymerizable monomer, and a second polymer obtained by ring-opening polymerization of a second ring-opening polymerizable monomer, and the first ring-opening polymerizable monomer and the second ring-opening polymerizable monomer be optical isomers to each other.

The device for producing a complex, which is a second device of the second embodiment, contains a plurality of the devices for continuously producing a polymer, and a mixing vessel configured to mix two or more polymers discharged from one polymer outlet and another polymer outlet of the plurality of the devices for continuously producing a polymer. The device may further contain other members, if necessary.

The method for producing a polymer is suitably carried out by the device for producing a complex.

Moreover, the device for producing a complex is preferably a tubular device for continuous production of a complex, in which the plurality of the devices for continuously producing a polymer are each the tubular device for continuous production of a polymer; the mixing vessel is a tubular mixing vessel having two or more polymer outlets for introducing two or more polymers at one end (upstream side), and having a complex outlet for discharging a complex obtained by mixing the two or more polymers at the other end; and the two or more polymer inlets are respectively connected to two or more outlets of the plurality of the devices for continuously producing a polymer.

Figure 6:
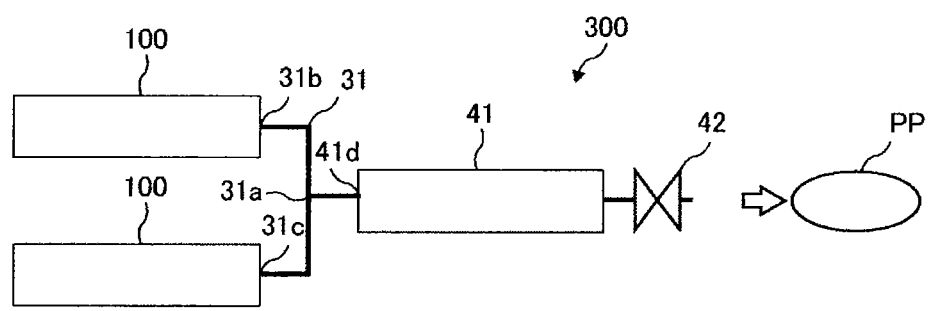
FIG. 6 is a schematic diagram illustrating a complex production system 300 for use in the second method of the present embodiment.

Subsequently, the second method will be explained with reference to FIG. 6. FIG. 6 is a schematic diagram illustrating a complex production system for use in the second method. The second method contains a second polymerization step, which contains continuously bringing the polymer obtained by the production method of the first embodiment and a monomer into contact with each other to polymerize the polymer and the monomer. The second method produces a complex product PP by continuously mixing a plurality of polymer products each produced by the production method of the first embodiment, in the presence of a compressive fluid. The plurality of the polymer products are, for example, products each obtained by polymerizing ring-opening polymerizable monomers that are optically isomeric to each other. The complex production system 300 contains a plurality of polymerization reactors 100, a mixing device 41, and a pressure adjustment valve 42.

In the complex production system 300, the polymer inlet 41a of the mixing device 41 is connected to an outlet (31b, 31c) of each polymerization reactor 100 via the pressure resistant pipe 31. The outlet of the polymerization reactor 100 means an outlet of an edge of a cylinder of the reaction section 13, an outlet of the metering pump 14 (FIG. 3), or an outlet of the pressure adjustment valve 16 (FIG. 4). In any case, the polymer product P generated in each polymerization reactor 100 can be supplied to the reaction section 33 in the melted state without turning back to the atmospheric pressure. As a result, it is possible to mix two or more polymer products P at lower temperature in the mixing device 41, as the polymer products P have low viscosity under the influence of the compressive fluid. Note that, FIG. 6 illustrates an example where two polymerization reactors 100 are provided parallel by providing one connector 31a to the pipe 31, but three or more polymerization reactors 100 may be provided parallel by providing a plurality of connectors.

The mixing device 41 is not particularly limited, provided that it is capable of mixing a plurality of polymer products supplied from the polymerization reactors 100, and examples thereof include a stirring device. As for the stirring device, a single screw stirring device, a twin-screw stirring device where screws are engaged with each other, a biaxial mixer containing a plurality of stirring elements which are engaged or overlapped with each other, a kneader containing spiral stirring elements which are engaged with each other, or a stick mixer is preferably used. The temperature (mixing temperature) for mixing the polymer products in the mixing device 41 can be set in the same manner as in setting the polymerization reaction temperature in the reaction section 13 of each polymerization reaction device 100. Note that, the mixing device 41 may separately contain a system for supplying a compressive fluid to the polymer products to be mixed. The pressure adjustment valve 42, as one example of the complex outlet, is a device for adjusting a flow rate of the complex product PP obtained by mixing the polymer products in the mixing device 41.

In the second method, an L-form monomer and D-form monomer (e.g., lactide) are each separately polymerized in a compressive fluid in a polymerization reactor 100. The polymer products obtained by polymerization are blended in the compressive fluid to thereby obtain a stereo block copolymer (a mixing step). Generally, a polymer such as polylactic acid tends to be decomposed as re-heated to the temperature equal to or higher than the melting point, even when the polymer has fewer monomer residues. The second method is effective because, similarly to the first method, racemization or thermal deterioration can be inhibited by blending low viscous polylactic acids melted in the compressive fluid.

In the first method and the second method, methods for producing a stereo complex by separately polymerizing ring-opening polymerizable monomers which are optically isomeric to each other are explained. However, ring-opening polymerizable monomers for use in the present embodiment are not necessarily optically isomeric to each other. Moreover, by combining the first method and the second method, block copolymers for forming a stereo complex can be mixed.

<<Effect of the Present Embodiments>>

In the present embodiments mentioned above, a ring-opening polymerizable monomer is subjected to ring-opening polymerization by continuously supplying and bringing at least a ring-opening polymerizable monomer and a compressive fluid into contact with each other, to continuously generate a polymer. In this case, the progress of the reaction is slow at the upstream side of the feeding path of the reaction section 13 of the polymerization reaction device 100, and therefore the viscosity within the system is low, and the viscosity within the system is high at the downstream side, as the progress of the reaction is fast. As a result, a local viscosity variation is not generated and therefore the reaction is accelerated. Accordingly, the time required for the polymerization reaction is shortened.

In accordance with the method for producing a polymer of the present embodiment, it is possible to provide a polymer product having excellent mold formability and thermal stability at low cost, with low environmental load, energy saving, and excellent energy saving, because of the following reasons.

(1) A reaction proceeds at low temperature compared to a melt polymerization method in which a reaction is proceeded at high temperature (e.g., 150° C. or higher);

(2) As the reaction proceeds at low temperature, a side reaction hardly occurs, and thus a polymer can be obtained at high yield relative to an amount of the ring-opening polymerizable monomer added (namely, an amount of unreacted ring-opening polymerizable monomer is small). Accordingly, a purification step for removing unreacted ring-opening polymerizable monomer, which is performed for attaining a polymer having excellent mold formability and thermal stability, can be simplified, or omitted.

(3) As a metal-free organic compound can be selected as a catalyst for use in the production of a polymer, intended use of which does not favor inclusion of a certain metal, it is not necessary to provide a step for removing the catalyst.

(4) In a polymerization method using an organic solvent, it is necessary to provide a step for removing a solvent to thereby yield a polymer product as a solid. In the polymerization method of the present embodiment, a drying step is simplified or omitted, because a waste liquid is not generated, and a dry polymer product can be obtained with one stage, as a compressive fluid is used.

(5) As the compressive fluid is used, a ring-opening polymerization reaction can be performed without an organic solvent. Note that, the organic solvent means a liquid organic compound used for dissolving the ring-opening polymerizable monomer.

(6) A uniform proceeding of a polymerization can be achieved because ring-opening polymerization is carried out by adding a catalyst after melting the ring-opening polymerizable monomer with the compressive fluid. Accordingly, the method of the present embodiment can be suitably used when optical isomers or copolymers with other monomers are produced.

EXAMPLES

The present embodiment will be more specifically explained through Examples and Reference Examples, but Examples shall not be construed as to limit the scope of the present invention in any way.

A molecular weight of a polymer obtained in Examples and Reference Examples, a polymerization rate of a monomer, and conduction productivity were determined in the following manners.

<Measurement of Molecular Weight of Polymer>

The molecular weight was measured through gel permeation chromatography (GPC) under the following conditions.
Apparatus: GPC-8020 (product of TOSOH CORPORATION)
Column: TSK G2000HXL and G4000HXL (product of TOSOH CORPORATION)
Temperature: 40° C.
Solvent: Tetrahydrofuran (THF)
Flow rate: 1.0 mL/min First, a calibration curve of molecular weight was obtained using monodispersed polystyrene serving as a standard sample. A polymer sample (1 mL) having a polymer concentration of 0.5% by mass was applied and measured under the above conditions, to thereby obtain the molecular weight distribution of the polymer. The number average molecular weight Mn and the weight average molecular weight Mw of the polymer were calculated from the calibration curve. The molecular weight distribution is a value calculated by dividing Mw with Mn.

<Polymerization Rate of Monomer>
Polymerization Rate of Lactide

Nuclear magnetic resonance (NMR) spectroscopy of polylactic acid of the polymer product or complex was performed in deuterated chloroform by means of a nuclear magnetic resonance apparatus (JNM-AL300, of JEOL Ltd.). In this case, a ratio of a quartet peak area attributed to lactide (4.98 ppm to 5.05 ppm) to a quartet peak area attributed to polylactic acid (5.10 ppm to 5.20 ppm) was calculated, and an amount of the unreacted lactide monomer (mol %) was determined by multiplying the obtained value from the calculation with 100. The polymerization rate is the value obtained by deducting the calculated amount of the unreacted monomer from 100.

Polymerization Rate of $\epsilon$-Caprolactone

Nuclear magnetic resonance (NMR) spectroscopy of polycaprolactone of the polymer product or complex was performed in deuterated chloroform by means of a nuclear magnetic resonance apparatus (JNM-AL300, of JEOL Ltd.). In this case, a ratio of a triplet peak area attributed to caprolactone (4.22 ppm to 4.25 ppm) to a triplet peak area attributed to polycaprolactone (4.04 ppm to 4.08 ppm) was calculated, and an amount of the unreacted caprolactone monomer (mol %) was determined by multiplying the obtained value from the calculation with 100. The polymerization rate is the value obtained by deducting the calculated amount of the unreacted monomer from 100.

<Continuous Productivity>

After continuously operating the polymerization reactor 100 for 8 hours, the biaxial stirring device of the contact section 9 of the polymerization reactor 100 was decomposed, and whether or not there was any deposition of a gelation product or the like on an area of the screw or single cylinder was visually observed. As a result of the visual evaluation, the case where there was no deposition of the gelation production was judged as "A," and the case where there were depositions of the gelation product was judged as "B."

Example 1

Ring-opening polymerization of a mixture (mass ratio: 90/10) of L-lactide and D-lactide was performed by means of the polymerization reactor 100 of FIG. 3. The configuration of the polymerization reactor 100 was as follows.
Tank 1, Metering Feeder 2:
  Plunger pump NP-S462, manufactured by Nihon Seimitsu Kagaku Co., Ltd.
  The tank 1 was charged with melted lactide as a ring-opening polymerizable monomer (a mixture of L-lactide and D-lactide (mass ratio: 90/10, manufacturer: Purac, melting point: 100° C.).
Tank 3, Metering Feeder 4:
  Intelligent HPLC pump (PU-2080), manufactured by JASCO Corporation
  The tank 3 was charged with lauryl alcohol as an initiator.
Tank 5, Metering Pump 6: Not used in Example 1
Tank 7: Carbonic acid gas cylinder
Tank 11, Metering Pump 12:
  Intelligent HPLC pump (PU-2080), manufactured by JASCO Corporation
  The tank 11 was charged with 1,8-diazabicyclo[5.4.0]undec-7-ene (DBU, manufacturer: Tokyo Chemical Industry Co., Ltd.) as a catalyst free from a metal atom.
Contact Section 9: biaxial stirring device equipped with screws engaged with each other
  inside diameter of cylinder: 30 mm
  preset temperature of cylinder: 100° C.
  biaxial rotation with identical directions
  rotational speed: 30 rpm
Reaction Section 13: two-axial kneader
  inside diameter of cylinder: 40 mm
  set temperature of cylinder raw materials: supply part 100° C., edge part 80° C.
  biaxial rotation with identical directions
  rotational speed: 60 rpm The biaxial stirring device of the contact section 9 and the two-axial kneader of the reaction section 13 were operated under the conditions above. The metering feeder 2 supplied the melted lactide stored in the tank 1 to the vessel of the biaxial stirring device at a constant rate. The metering feeder 4 supplied lauryl alcohol stored in the tank 3 to the vessel of the biaxial stirring device so that the feeding amount of the lactide was 0.5 mol relative to 99.5 mol of the feeding amount of the lactide. The metering pump 8 supplied carbonic acid gas (carbon dioxide), serving as a compressive fluid, from the tank 7 so that the internal pressure of the vessel of the biaxial stirring device becomes 15 MPa. As a result, the biaxial stirring device continuously brought the raw materials, lactic acid and lauryl alcohol, supplied from the tanks (1, 3, 7) into contact with the compressive fluid, and mixed the mixture by a screw to thereby melt each of the raw materials.

Each of the raw materials melted in the contact section 9 was sent to the reaction section 13 by means of the liquid transfer pump 10. The metering pump 12 supplied a metal atom-free organic catalyst (DBU) in the tank 11 to a raw material feed orifice of a two-axial kneader serving as the reaction section 13, so that the amount of the organic catalyst was to be 0.1 mol relative to 99.9 mol of lactide. The raw materials sent by the liquid transfer pump 10 and DBU fed by the metering pump 12 were mixed in the two-axial kneader to thereby polymerize lactide by ring-opening polymerization. In this case, the average retention time of each of the raw materials in the two-axial kneader was about 1,200 seconds. At the edge of the two-axial kneader, a metering pump 14, and a discharge nozzle 15 were provided. The flow speed of a polymer (polylactic acid), as a polymer product, by means of the metering pump 14 was 200 g/min. The physical properties (Mn, Mw/Mn, polymerization rate) of the obtained polymer product of Example 1 were measured in the aforementioned manners, and the continuous productivity was evaluated. The results are presented in Table 1.

Examples 2 to 4

Polymer products of Examples 2 to 4 were produced in the same manner as in Example 1, provided that the temperature of the cylinder of the two-axial kneader of the reaction section 13 was changed as depicted in Table 1. Physical properties of the obtained polymer products were measured by the aforementioned manners. The results are presented in Table 1.

Examples 5 to 7

Polymer products of Examples 5 to 7 were produced in the same manner as in Example 1, provided that the internal pressure of the cylinder of the contact section 9 was changed as depicted in Table 1. Physical properties of the obtained polymer products were measured by the aforementioned manners. The results are presented in Table 1.

Examples 8 to 10

Polymer products of Examples 8 to 10 were produced in the same manner as in Example 1, provided that the feeding speed and average retention time of the polymer product were changed as depicted in Table 2. Physical properties of the obtained polymer products were measured by the aforementioned manners. The results are presented in Table 2.

Examples 11 to 13

Polymer products of Examples 11 to 13 were produced in the same manner as in Example 1, provided that the amount of the initiator was changed as depicted in Table 2. Physical properties of the obtained polymer products were measured by the aforementioned manners. The results are presented in Table 2.

Examples 14 to 16

Polymer products of Examples 14 to 16 were produced in the same manner as in Example 1, provided that the catalyst for use was changed as depicted in Table 3. Physical properties of the obtained polymer products were measured by the aforementioned manners. The results are presented in Table 3.

Moreover, the abbreviations in Table 3 are as follows:
DABCO: 1,4-diazabicyclo[2.2.2]octane (manufacturer: Tokyo Chemical Industry Co. Ltd.)
DMAP: N,N-dimethyl-4-aminopyridine (manufacturer: Tokyo Chemical Industry Co. Ltd.)
ITBU: 1,3-di-tert-butylimidazol-2-ylidene (manufacturer: Tokyo Chemical Industry Co. Ltd.)
Tin: tin di(2-ethylhexanoate) (manufacturer: Wako Pure Chemical Industries, Ltd.)

Example 30

A polymer product of Example 30 was produced in the same manner as in Example 1, provided that the catalyst for use, and the temperature of the two-axial kneader of the reaction section 13 were changed as depicted in Table 3. Physical properties of the obtained polymer products were measured in the methods described above. The results are presented in Table 3.

Example 17

Ring-opening polymerization of a mixture (mass ratio: 90/10) of L-lactide and D-lactide was carried out by means of a polymerization reactor 100 illustrated in FIG. 4. The polymerization reactor 100 of FIG. 4 used in Example 17 had the same structure as that of the polymerization reactor 100 of FIG. 3 used in Example 1, provided that as the contact section 9 and the reaction section 13, ⅛-inch pressure resistant pipes without stirring functions were used, and the metering pump 14 was replaced with a pressure adjustment valve 16.

The metering feeder 2 constantly supplied lactide in the melted state stored in the tank 1 into a pipe of the contact section 9 at the flow rate of 4 g/min. The metering feeder 4 constantly supplied lauryl alcohol in the tank 3 into the pipe of the contact section 9 so that the amount of the lauryl alcohol was to be 0.5 mol relative to 99.5 mol of lactide. The metering pump 8 continuously supplied the carbonic acid gas in the tank 7 into the pipe of the contact section 9 so that the amount of the carbonic acid gas was to be 5 parts by mass relative to 100 parts by mass of the raw materials supplied per unit time. Accordingly, the feeding ratio was set as follows:

Feeding ratio=[feeding speed of raw materials (g/min)]/[feeding speed of compressive fluid (g/min)]=100/5=20.

In the above equation, the raw materials represent lactide serving as a ring-opening polymerizable monomer, and lauryl alcohol serving as an initiator. Note that, the feeding speed of the raw materials was 4.26 g/min. Further, the opening of the pressure adjustment valve 16 was adjusted so that the internal pressure of the polymerization system was to be 15 MPa. Moreover, the set temperature adjacent to the inlet 9a for raw materials of the contact section 9 was set to 100° C., and the set temperature adjacent to the outlet for the melt blended raw materials was set to 60° C. In the manner as mentioned above, the contact section 9 continuously brought the raw materials including lactide and lauryl alcohol, and the compressive fluid, all of which had been supplied from the tanks (1, 3, 7), into contact with each other, mixed together, and melted.

Each raw material melted in the contact section 9 was sent to the reaction section 13 by means of the liquid transfer pump 10. By introducing a polymerization catalyst (DBU) stored in the tank 11 by means of the metering pump 12 into the reaction section 13 so that the amount of the polymerization catalyst was to be 0.1 mol relative to 99.9 mol of lactide, ring-opening polymerization of lactide was performed in the presence of DBU. The preset temperature adjacent to the inlet 13a of the reaction section 13 was set to 60° C., the preset temperature of the edge part thereof was set to 60° C., and the average retention time of each raw material in the reaction section 13 was set to about 1,200 seconds. Physical properties (Mn, Mw/Mn, and polymerization rate) of the polymer product (polylactic acid) of Example 17 obtained through the pressure adjustment valve 16 were measured in the manners described above. The results are presented in Table 4.

Examples 18 to 21

Polymer products of Examples 18 to 21 were produced in the same manner as in Example 17, provided that the feeding speed of the carbonic acid gas supplied by the metering pump 8 was changed as depicted in Table 4. Physical properties (Mn, Mw/Mn, polymerization rate) of the obtained polymer products were measured in the methods described above. The results are presented in Table 4.

Example 22

A polymer product of Example 22 was produced in the same manner as in Example 17, provided that the monomer for use and the catalyst for use were changed as depicted in Table 4. Physical properties (Mn, Mw/Mn, polymerization rate) of the obtained polymer products were measured in the methods described above. The results are presented in Table 4. Note that, the abbreviation in Table 4 is as follows:
TBD: 1,5,7-triazabicyclo[4.4.0]dec-5-ene (manufacturer: Tokyo Chemical Industry Co. Ltd.)

Example 23

A complex of Example 23 was produced by means of a complex production system 300 illustrated in FIG. 6. Among a plurality of polymerization reactors 100 in the complex production system 300, one polymerization reactor is referred to as the polymerization reactor 100 of System 1, and the other polymerization reactor is referred to as the polymerization reactor 100 of System 2, hereinafter. The configuration of the complex production system 300 is as follows.
polymerization reactor 100 (System 1, 2): the same polymerization reactor as the one used in Example 17
mixing device 41: biaxial stirring device equipped with screws that were engaged with each other
  inside diameter of cylinder: 40 mm
  biaxial rotation with identical directions
  rotational speed: 30 rpm L-lactide was polymerized in the polymerization reactor 100 of System 1 in the same manner as in Example 17, provided that the monomer for use and the monomer feeding speed were changed as depicted in Table 5. Note that, the monomer feeding speed is a feeding speed when the monomer is supplied from the tank 1 to the contact section 9. Concurrently, D-lactide was polymerized in the polymerization reactor 100 in System 2 in the same manner as in Example 17, provided that the monomer for use and the monomer feeding speed were changed as depicted in Table 5. Each of the polymer products (poly-L-lactide, poly-D-lactide) obtained in the respective polymerization reactor 100 in the melted state was directly and continuously supplied to the mixing device 41 by each metering pump 14, in the presence of the pressure of a compressive fluid. A complex of Example 23 (polylactic acid forming a stereo complex) was formed by continuously mixing the polymer products by the mixing device 41 under the conditions as depicted in Table 5. Physical properties (Mn, Mw/Mn, polymerization rate) of the obtained complexes were measured in the methods described above. The results are presented in Table 5.

Examples 24 to 25

Complexes of Examples 24 to 25 were produced in the same manner as in Example 23, provided that the monomers for use and the feeding amount of the monomer were changed as depicted in Table 5. Physical properties (Mn, Mw/Mn, polymerization rate) of the obtained complexes were measured in the methods described above. The results are presented in Table 5.

Example 26

A complex of Example 26 was produced by means of a complex production system 200 of FIG. 5. The device of FIG. 5 has a configuration where two polymerization reactors 100 of FIG. 3 are connected tandemly as the polymerization device of System 1 and the polymerization device of System 2. The configuration of the complex production system 200 is as follows.
Tank 1, Metering Feeder 2:
  plunger pump NP-S462, manufactured by Nihon Seimitsu Kagaku Co., Ltd.
  tank 1 was charged with a 99/1 (molar ratio) mixture of L-lactide in the melted state as a ring-opening polymerizable monomer (first monomer), and
  lauryl alcohol as an initiator.
Tank 3, Metering feeder 4: Not used in Example 26
Tank 5, Metering pump 6: Not used in Example 26
Tank 7: carbonic acid gas cylinder
Tank 27: carbonic acid gas cylinder
Tank 21, Metering feeder 22:
  plunger pump NP-S462, manufactured by Nihon Seimitsu Kagaku Co., Ltd.
  tank 21 was charged with D-lactide in the melted state as a ring-opening polymerizable monomer (second monomer).
Tank 11, Metering pump 12:
  intelligent HPLC pump (PU-2080), manufactured by JASCO Corporation
  tank 11 was charged with DBU (metal atom-free organic catalyst).
Contact section 9: biaxial stirring device equipped with screws engaged with each other
  inside diameter of cylinder: 30 mm
  biaxial rotation with identical directions
  rotational speed: 30 rpm
Contact section 29: biaxial stirring device equipped with screws engaged with each other
  Inside diameter of cylinder: 30 mm
  biaxial rotation with identical directions
  Rotational speed: 30 rpm Reaction section 13: two-axial kneader
  Inside diameter of cylinder: 40 mm
  Biaxial rotation with identical directions
  Rotational speed: 60 rpm
Reaction section 33: two-axial kneader
  inside diameter of cylinder: 40 mm
  biaxial rotation with identical directions
  rotational speed: 60 rpm The metering feeder 2 was operated to constantly supply a mixture of L-lactide and lauryl alcohol in the tank 1 to the vessel of the biaxial stirring device of the contact section 9 at the flow rate of 4 g/min (feeding speed of the raw material). The metering pump 8 was operated to continuously supply carbonic acid gas in the tank 7 to the vessel of the biaxial stirring device of the contact section 9 so that the amount of the carbonic acid gas was 5 parts by mass relative to 100 parts by mass of the supplied amount of the raw materials (L-lactide and lauryl alcohol). Specifically, the feeding ratio was set as follows:

Feeding ratio=feeding speed of raw materials (g/min)/feeding speed of compressive fluid (g/min)=100/5=20

In the manner as mentioned, the raw materials including L-lactide and lauryl alcohol, and the compressive fluid were continuously brought into contact with each other and the raw materials were melted in the biaxial stirring device.

The raw materials melted in the biaxial stirring device were sent to the two-axial kneader of the reaction section 13 by means of the liquid transfer pump 10. Meanwhile, the metering pump 12 was operated to supply the polymerization catalyst (DBU) stored in the tank 11 to the two-axial kneader so that the amount of the polymerization catalyst was 99:1 in the molar ratio relative to the supplied amount of L-lactide. In the manner as mentioned, ring-opening polymerization of L-lactide was performed in the two-axial kneader in the presence of DBU.

Further, the metering feeder 22 was operated to constantly supply D-lactide, which was a second ring-opening polymerizable monomer, stored in the tank 21 to the vessel of the biaxial stirring device of the contact section 29 at the 4 g/min (feeding speed of the raw material). Moreover, the metering pump 28 was operated to continuously supply carbonic acid gas in the tank 27 to the vessel of the biaxial stirring device of contact section 9 so that the amount of the carbonic acid gas was 5 parts by mass relative to 100 parts by mass of the supplied amount of D-lactide (feed ratio=20). In the manner as mentioned above, D-lactide and the compressive fluid were continuously brought into contact with each other and the D-lactide was melted in the biaxial stirring device.

The polymer product (L-polylactic acid), as the intermediate product of the melted state polymerized in reaction section 13, and D-lactide melted in the contact section 29 were both introduced into the two-axial kneader of the reaction vessel 33. In the manner as mentioned, the polymer product (L-polylactic acid) as the intermediate product, and the second ring-opening polymerizable monomer (D-lactide) were polymerized in the two-axial kneader.

Note that, in Example 26, the internal pressures of the biaxial stirring device of the contact section 9, and those of the two-axial kneaders of reaction vessels (13, 33) were set to 15 MPa by adjusting the opening and closing degree of the pressure adjustment valve 34. The temperatures of the vessels of the biaxial stirring devices of the melt blending device (9, 29) were each 100° C. at the inlet, and 60° C. at the outlet. The temperatures of the two-axial kneaders of the reaction vessels (13, 33) were each 60° C. at both the inlet and the outlet. Moreover, the average retention time of each raw material in the biaxial stirring device of the contact section 9, and in the two-axial kneaders of the reaction vessels (13, 33) was set to 1,200 seconds by adjusting the length of the piping system of the biaxial stirring device of each contact section 9, and that of the two-axial kneader of each reaction vessel (13, 33).

The pressure adjustment valve 34 was provided at the edge of the two-axial kneader of the reaction section 33, and a complex (polylactic acids forming a stereo complex) was continuously discharged from the pressure adjustment valve 34. Physical properties (Mn, Mw/Mn, polymerization rate) of the obtained complexes were measured in the methods described above. The results are presented in Table 6.

Examples 27 to 29

Complex products PP of Complex products of Examples 27 to 29 were produced as a final polymer product in the same manner as in Example 26, provided that the initiator was changed to hexanediol (Example 27), aliphatic polycarbonate diol, which was DURANOL T5652 manufactured by Asahi Kasei Corporation (Example 28), and polyester diol, which was OD-X-668 manufactured by DIC Corporation (Example 29), respectively, and the amount of the initiator was changed as depicted in Table 6. Physical properties (Mn, Mw/Mn, polymerization rate) of the obtained complexes were measured in the methods described above. The results are presented in Table 6.

TABLE 1

|  |  | Ex. 1 | Ex. 2 | Ex. 3 | Ex. 4 | Ex. 5 | Ex. 6 | Ex. 7 |
|---|---|---|---|---|---|---|---|---|
| Monomer |  | Lactide | Lactide | Lactide | Lactide | Lactide | Lactide | Lactide |
| Amount (mol %) of initiator |  | 0.5 | 0.5 | 0.5 | 0.5 | 0.5 | 0.5 | 0.5 |
| Catalyst |  | DBU | DBU | DBU | DBU | DBU | DBU | DBU |
| Internal temp. of reaction vessel | Raw material supplying part (° C.) | 100 | 60 | 80 | 120 | 100 | 100 | 100 |
|  | Edge part (° C.) | 80 | 40 | 60 | 100 | 80 | 80 | 80 |
| Internal pressure of melt blending device (MPa) |  | 15 | 15 | 15 | 15 | 10 | 20 | 30 |
| Polymer feeding speed (g/min.) |  | 200 | 200 | 200 | 200 | 200 | 200 | 200 |
| Average retention time (second) |  | 1,200 | 1,200 | 1,200 | 1,200 | 1,200 | 1,200 | 1,200 |

TABLE 1-continued

|  | Ex. 1 | Ex. 2 | Ex. 3 | Ex. 4 | Ex. 5 | Ex. 6 | Ex. 7 |
|---|---|---|---|---|---|---|---|
| Number average molecular weight (Mn) | 22,000 | 20,000 | 24,000 | 22,000 | 23,000 | 20,000 | 18,000 |
| Molecular weight distribution (Mw/Mn) | 1.8 | 1.5 | 1.6 | 1.4 | 1.8 | 1.4 | 1.4 |
| Polymerization rate (mol %) | 100 | 98 | 99 | 100 | 100 | 100 | 100 |
| Continuous running properties | A | A | A | A | A | A | A |

TABLE 2

|  |  | Ex. 8 | Ex. 9 | Ex. 10 | Ex. 11 | Ex. 12 | Ex. 13 |
|---|---|---|---|---|---|---|---|
| Monomer |  | Lactide | Lactide | Lactide | Lactide | Lactide | Lactide |
| Amount (mol %) of initiator |  | 0.5 | 0.5 | 0.5 | 1.0 | 0.2 | 0.1 |
| Catalyst |  | DBU | DBU | DBU | DBU | DBU | DBU |
| Internal temp. of reaction vessel | Raw material supplying part (° C.) | 100 | 100 | 100 | 100 | 100 | 100 |
|  | Edge part (° C.) | 80 | 80 | 80 | 80 | 80 | 80 |
| Internal pressure of melt blending device (MPa) |  | 15 | 15 | 15 | 15 | 15 | 15 |
| Polymer feeding speed (g/min.) |  | 400 | 300 | 100 | 200 | 200 | 200 |
| Average retention time (second) |  | 600 | 800 | 2,400 | 1,200 | 1,200 | 1,200 |
| Number average molecular weight (Mn) |  | 18,000 | 19,000 | 21,000 | 11,000 | 46,000 | 93,000 |
| Molecular weight distribution (Mw/Mn) |  | 1.6 | 1.6 | 1.4 | 1.8 | 1.8 | 1.8 |
| Polymerization rate (mol %) |  | 100 | 100 | 100 | 100 | 100 | 100 |
| Continuous running properties |  | A | A | A | A | A | A |

TABLE 3

|  |  | Ex. 14 | Ex. 15 | Ex. 16 | Ex. 30 |
|---|---|---|---|---|---|
| Monomer |  | Lactide | Lactide | Lactide | Lactide |
| Amount (mol %) of initiator |  | 0.5 | 0.5 | 0.5 | 0.5 |
| Catalyst |  | DABCO | DMAP | ITBU | Tin |
| Internal temp. of reaction vessel | Raw material supplying part (° C.) | 100 | 100 | 100 | 140 |
|  | Edge part (° C.) | 80 | 80 | 80 | 140 |
| Internal pressure of melt blending device (MPa) |  | 15 | 15 | 15 | 15 |
| Polymer feeding speed (g/min.) |  | 200 | 200 | 200 | 200 |
| Average retention time (seconds) |  | 1,200 | 1,200 | 1,200 | 1,200 |
| Number average molecular weight (Mn) |  | 20,000 | 21,000 | 24,000 | 22,000 |
| Molecular weight distribution (Mw/Mn) |  | 1.9 | 1.7 | 1.7 | 2.0 |
| Polymerization rate (mol %) |  | 100 | 100 | 100 | 99 |
| Continuous running properties |  | A | A | A | A |

TABLE 4

|  | Ex. 17 | Ex. 18 | Ex. 19 | Ex. 20 | Ex. 21 | Ex. 22 |
|---|---|---|---|---|---|---|
| Monomer | Lactide | Lactide | Lactide | Lactide | Lactide | ε-caprolactone |
| Amount (mol %) of initiator | 0.5 | 0.5 | 0.5 | 0.5 | 0.5 | 0.5 |

TABLE 4-continued

|  |  | Ex. 17 | Ex. 18 | Ex. 19 | Ex. 20 | Ex. 21 | Ex. 22 |
|---|---|---|---|---|---|---|---|
| Catalyst | | DBU | DBU | DBU | DBU | DBU | TBD |
| Internal temp. of reaction vessel | Raw material supplying part (° C.) | 60 | 60 | 60 | 60 | 60 | 60 |
| | Edge part (° C.) | 60 | 60 | 60 | 60 | 60 | 60 |
| Internal pressure of polymerization system (MPa) | | 15 | 15 | 15 | 15 | 15 | 15 |
| Feeding ratio | | 20 | 10 | 5 | 3 | 1 | 20 |
| Average retention time (second) | | 1,200 | 1,200 | 1,200 | 1,200 | 1,200 | 1,200 |
| Number average molecular weight (Mn) | | 18,000 | 17,000 | 19,000 | 18,000 | 17,000 | 16,000 |
| Molecular weight distribution (Mw/Mn) | | 1.8 | 1.5 | 1.7 | 1.9 | 2.0 | 2.0 |
| Polymerization rate (mol %) | | 100 | 100 | 99 | 99 | 98 | 94 |

TABLE 5

|  |  |  | Ex. 23 | | Ex. 24 | | Ex. 25 | |
|---|---|---|---|---|---|---|---|---|
|  |  |  | System 1 | System 2 | System 1 | System 2 | System 1 | System 2 |
| Monomer | | | L-lactide | D-lactide | L-lactide | ε-caprolactone | L-lactide | Propylene carbonate |
| Amount of initiator (mol %) | | | 0.5 | 0.5 | 0.5 | 0.5 | 0.5 | 0.5 |
| Catalyst | | | DBU | DBU | DBU | DBU | DBU | DBU |
| Polymerization step | Monomer feeding speed (g/min) | | 200 | 200 | 600 | 200 | 200 | 600 |
| | Internal temp. of reaction vessel | Raw material supplying part (° C.) | 60 | 60 | 60 | 60 | 60 | 60 |
| | | Edge part (° C.) | 60 | 60 | 60 | 60 | 60 | 60 |
| | Internal pressure of polymerization system (MPa) | | 15 | 15 | 15 | 15 | 15 | 15 |
| | Feeding ratio | | 20 | 20 | 20 | 20 | 20 | 20 |
| | Average retention time (second) | | 1,200 | 1,200 | 1,200 | 1,200 | 1,200 | 1,200 |
| Mixing step | Internal temperature of mixing device | Raw material supplying part (° C.) | 60 | | 60 | | 60 | |
| | | Edge part (° C.) | 60 | | 60 | | 60 | |
| | Internal pressure of mixing device | | 15 | | 15 | | 15 | |
| | Average retention time (second) | | 600 | | 600 | | 600 | |
| Number average molecular weight (Mn) | | | 18,000 | | 17,000 | | 18,000 | |
| Molecular weight distribution (Mw/Mn) | | | 1.8 | | 1.5 | | 1.8 | |
| Polymerization rate (mol %) | | | 100 | | 100 | | 100 | |

TABLE 6

|  | Ex. 26 | Ex. 27 | Ex. 28 | Ex. 29 |
|---|---|---|---|---|
| First monomer | L-lactide | L-lactide | L-lactide | L-lactide |
| Second monomer | D-lactide | D-lactide | D-lactide | D-lactide |
| Initiator | Lauryl alcohol | Hexane diol | Polycarbonate diol | Polyester diol |
| Amount of initiator | 1 mol % | 1 mol % | 20 wt % | 20 wt % |
| Feeding speed of raw material (g/min) | Pump 2 | 4 | 4 | 4 | 4 |
| | Pump 22 | 4 | 4 | 4 | 4 |

TABLE 6-continued

|  |  | Ex. 26 | Ex. 27 | Ex. 28 | Ex. 29 |
|---|---|---|---|---|---|
| Feeding ratio | Pump 2/ Pump 9 | 20 | 20 | 20 | 20 |
|  | Pump 22/ Pump 29 | 20 | 20 | 20 | 20 |
| Internal pressure (MPa) |  | 15 | 15 | 15 | 15 |
| Number average molecular weight (Mn) |  | 17,000 | 17,000 | 18,000 | 17,000 |
| Molecular weight distribution (Mw/Mn) |  | 2.0 | 2.0 | 2.0 | 2.0 |
| Polymerization rate (mol %) |  | 99 | 99 | 98 | 99 |

The embodiments of the present invention are as follows:

<1> A method for producing a polymer, containing:

(i) continuously supplying and bringing at least a ring-opening polymerizable monomer and a compressive fluid into contact with each other, to thereby allow the ring-opening polymerizable monomer to carry out ring-opening polymerization to continuously generate a polymer.

<2> The method according to <1>, further containing:

continuously mixing two or more polymers including the polymer obtained by the (i) in the presence of the compressive fluid.

<3> The method according to <2>, wherein the two or more polymers include a first polymer and a second polymer, where the first polymer is obtained through ring-opening polymerization of a first ring-opening polymerizable monomer, and the second polymer is obtained through ring-opening polymerization of a second ring-opening polymerizable monomer, and wherein the first ring-opening polymerizable monomer and the second ring-opening polymerizable monomer are optical isomers to each other.

<4> The method according to <1>, further containing:

(ii) continuously bringing the polymer obtained through the ring-opening polymerization of the ring-opening polymerizable monomer in the (i) and a second ring-opening polymerizable monomer into contact with each other, to thereby allow the polymer and the second ring-opening polymerizable monomer to carry out polymerization.

<5> The method according to any one of <1> to <4>, wherein the (i) contains supplying raw materials including the ring-opening polymerizable monomer, and the compressive fluid with a feeding ratio represented by the following formula:

Feeding ratio=feeding speed of raw materials (g/min)/ feeding speed of compressive fluid (g/min)≥1, to thereby bring the raw materials and the compressive fluid into contact with each other.

<6> The method according to any one of <1> to <5>, wherein the continuously supplying and bringing at least the ring-opening polymerizable monomer and the compressive fluid into contact with each other makes the ring-opening polymerizable monomer melt.

<7> The method according to any one of <1> to <6>, wherein the ring-opening polymerizable monomer is allowed to react in the presence of an organic catalyst free from a metal atom.

<8> The method according to <7>, wherein the organic catalyst free from a metal atom is a basic nucleophilic nitrogen compound.

<9> The method according to any one of <1> to <8>, wherein a lower limit of a polymerization reaction temperature in the (i) is 40° C., and wherein an upper limit thereof in the (i) is 100° C., or a temperature that is higher than a melting point of the ring-opening polymerizable monomer by 30° C., whichever higher.

<10> The method according to any one of <1> to <9>, wherein a polymerization rate of the ring-opening polymerizable monomer is 98 mol % or higher, where the polymerization rate is a rate of the ring-opening polymerizable monomer transformed into the polymer.

<11> The method according to any one of <1> to <10>, wherein the polymer has a number average molecular weight of 12,000 or greater.

<12> The method according to any one of <1> to <11>, wherein the compressive fluid contains carbon dioxide.

<13> The method according to any one of <1> to <12>, wherein the ring-opening polymerizable monomer is a monomer having a ring structure containing an ester bond therein.

<14> A device for producing a polymer, containing:

a reaction section through which a compressive fluid passes, where the reaction section contains:

a monomer inlet disposed at an upstream side of the reaction section, and configured to introduce a ring-opening polymerizable monomer;

a catalyst inlet disposed at a downstream side of the reaction section with respect to the monomer inlet, and configured to introduce a catalyst; and a polymer outlet disposed at a downstream side of the reaction section with respect to the catalyst inlet, and configured to discharge a polymer obtained through polymerization of the ring-opening polymerization monomer.

<15> A device for producing a complex, containing:

a plurality of the device for producing a polymer as defined in <14>; and a mixing vessel configured to mix two or more polymers discharged from one polymer outlet and another polymer outlet in the plurality of the device for producing a polymer.

<16> A device for producing a complex, containing:

the device for producing a polymer, as defined in <14>; and a second reaction section through which a compressive fluid passes, where the second reaction section contains:

a second monomer inlet and a first polymer inlet, both disposed at an upper stream side of the second reaction section, where the second monomer inlet is configured to introduce a second ring-opening polymerizable monomer, and the first polymer inlet is configured to introduce a first polymer discharged from the polymer outlet of the device for producing a polymer;

a second catalyst inlet disposed at a downstream side of the second reaction section with respect to the second monomer inlet, and configured to introduce a second catalyst; and a complex outlet disposed at a downstream side of the second reaction section with respect to the second catalyst inlet, and configured to discharge a complex obtained through polymerization of the first polymer with the second ring-opening polymerizable monomer.

<17> A polymer product, which is a polymer product obtained by the method as defined in any one of <1> to <13>, and is substantially free from an organic solvent and a metal atom, contains ring-opening polymerizable monomer residues in an amount of less than 2 mol %, and has a number average molecular weight of 12,000 or greater.

<18> The polymer product according to <17>, wherein the polymer product is a copolymer having two or more polymer segments.

<19> The polymer product according to <17>, wherein the polymer product is a stereo complex.

REFERENCE SIGNS LIST 1, 3, 5, 7, 11, 21, 27: tank
2, 4, 22: metering feeder
6, 8, 12, 14, 28: metering pump
9, 29: contact section
9a: inlet (one example of a compressive fluid inlet)
9b: inlet (one example of a monomer inlet)
10: liquid transfer pump
13, 33: reaction section
13a: inlet
13b: inlet (one example of a catalyst inlet)
15: discharge nozzle (one example of a polymer outlet)
16: pressure adjustment valve
30, 31: pipe
33a, 41a: polymer inlet
34: pressure adjustment valve (one example of a complex outlet)
41: mixing device
42: pressure adjustment valve (one example of a complex outlet)
41: mixing device (one example of a device for continuous production of a complex)
100: polymerization reactor
100a: supply unit
100b: main body of polymerization reactor (one example of device for continuous production of a polymer)
200: complex production system
201: System 1
202: System 2
300: complex production system
P: polymer product
PP: complex product

The invention claimed is:

1. A method for producing a polymer, the method comprising:
   (i) continuously supplying and bringing at least a ring-opening polymerizable monomer and a compressive fluid into contact with each other, to thereby allow the ring-opening polymerizable monomer to carry out ring-opening polymerization to continuously generate a polymer, thereby continuously obtaining the polymer.

2. The method according to claim 1, further comprising:
   continuously mixing two or more polymers including the polymer obtained by the (i) in the presence of the compressive fluid.

3. The method according to claim 2, wherein the two or more polymers comprise a first polymer and a second polymer, where the first polymer is obtained through ring-opening polymerization of a first ring-opening polymerizable monomer, and the second polymer is obtained through ring-opening polymerization of a second ring-opening polymerizable monomer, and
   wherein the first ring-opening polymerizable monomer and the second ring-opening polymerizable monomer are optical isomers to each other.

4. The method according to claim 1, further comprising:
   (ii) continuously bringing the polymer obtained through the ring-opening polymerization of the ring-opening polymerizable monomer in the (i) and a second ring-opening polymerizable monomer into contact with each other, to thereby allow the polymer and the second ring-opening polymerizable monomer to carry out polymerization.

5. The method according to claim 1, wherein the (i) comprises supplying a raw material comprising the ring-opening polymerizable monomer, and the compressive fluid with a feeding ratio represented by the following formula:

Feeding ratio = feeding speed of raw materials (g/min) / feeding speed of compressive fluid (g/min) ≥ 1, to thereby bring the raw materials and the compressive fluid into contact with each other.

6. The method according to claim 1, wherein the continuously supplying and bringing at least the ring-opening polymerizable monomer and the compressive fluid into contact with each other makes the ring-opening polymerizable monomer melt.

7. The method according to claim 1, wherein the ring-opening polymerizable monomer is allowed to react in the presence of an organic catalyst free from a metal atom.

8. The method according to claim 7, wherein the organic catalyst free from a metal atom is a basic nucleophilic nitrogen compound.

9. The method according to claim 1, wherein a lower limit of a polymerization reaction temperature in the (i) is 40° C., and
   wherein an upper limit thereof in the (i) is 100° C., or a temperature that is higher than a melting point of the ring-opening polymerizable monomer by 30° C., whichever higher.

10. The method according to claim 1, wherein a polymerization rate of the ring-opening polymerizable monomer is 98 mol % or higher, wherein the polymerization rate is a rate of the ring-opening polymerizable monomer transformed into the polymer.

11. The method according to claim 1, wherein the polymer has a number average molecular weight of 12,000 or greater.

12. The method according to claim 1, wherein the compressive fluid comprises carbon dioxide.

13. The method according to claim 1, wherein the ring-opening polymerizable monomer is a monomer comprising a ring structure comprising an ester bond therein.

14. A device for producing a polymer, comprising:
   a reaction section through which a compressive fluid passes, where the reaction section comprises:
   a monomer inlet disposed at an upstream side of the reaction section, and configured to introduce a ring-opening polymerizable monomer;
   a catalyst inlet disposed at a downstream side of the reaction section with respect to the monomer inlet, and configured to introduce a catalyst; and
   a polymer outlet disposed at a downstream side of the reaction section with respect to the catalyst inlet, and configured to discharge a polymer obtained through polymerization of the ring-opening polymerization monomer.

15. A polymer product obtained by a method comprising:
   (i) continuously supplying and bringing at least a ring-opening polymerizable monomer and a compressive fluid into contact with each other, to thereby allow the ring-opening polymerizable monomer to carry out ring-opening polymerization to continuously generate a polymer,
   wherein the polymer product comprises said polymer and is substantially free from an organic solvent and a metal atom, comprises ring-opening polymerizable monomer residues in an amount of less than 2 mol %, and the polymer has a number average molecular weight of 12,000 or greater.

16. The polymer product according to claim 15, wherein the polymer product is a copolymer comprising two or more polymer segments.

17. The polymer product according to claim 15, wherein the polymer product is a stereo complex.

* * * * *